United States Patent
Goossens et al.

(10) Patent No.: US 11,276,217 B1
(45) Date of Patent: Mar. 15, 2022

(54) CUSTOMIZED AVATARS AND ASSOCIATED FRAMEWORK

(71) Applicant: Apple Inc., Cupertino, CA (US)

(72) Inventors: Thomas Goossens, Paris (FR); Aymeric Bard, Paris (FR); Alexandre Carlhian, Paris (FR); Thomas Deniau, Paris (FR); Raphaël Mor, Paris (FR)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/806,973

(22) Filed: Mar. 2, 2020

Related U.S. Application Data

(63) Continuation of application No. 15/274,518, filed on Sep. 23, 2016, now Pat. No. 10,607,386.

(60) Provisional application No. 62/349,048, filed on Jun. 12, 2016.

(51) Int. Cl.
*G06T 13/40* (2011.01)
*H04L 12/58* (2006.01)
*H04L 51/10* (2022.01)

(52) U.S. Cl.
CPC .............. *G06T 13/40* (2013.01); *H04L 51/10* (2013.01)

(58) Field of Classification Search
CPC .... G06T 13/40; G06T 13/00–80; H04L 51/10
See application file for complete search history.

(56) References Cited

U.S. PATENT DOCUMENTS

| | | | |
|---|---|---|---|
| 5,745,650 A | 4/1998 | Otsuka | |
| 6,144,938 A | 11/2000 | Surace | |
| 6,686,918 B1 | 2/2004 | Cajolet | |
| 6,757,362 B1 | 6/2004 | Cooper | |
| 7,659,896 B2 | 2/2010 | Hoddie | |
| 7,669,134 B1 | 2/2010 | Christie et al. | |
| 8,249,305 B2 | 8/2012 | Kondo | |
| 8,509,458 B2 | 8/2013 | Nakamura | |
| 8,648,865 B2 | 2/2014 | Dawson et al. | |

(Continued)

FOREIGN PATENT DOCUMENTS

| | | |
|---|---|---|
| WO | WO 2013/152453 | 10/2013 |
| WO | WO 2015/162072 | 10/2015 |

(Continued)

OTHER PUBLICATIONS

Business Insider—Snapchat now lets you add fun stickers to photos and videos, May 23, 2016, 4 pages.

(Continued)

*Primary Examiner* — Daniel F Hajnik
(74) *Attorney, Agent, or Firm* — Morgan, Lewis & Bockius LLP

(57) ABSTRACT

Various embodiments provide for techniques to facilitate online communication. In one embodiment, the communication is facilitated by providing a framework to enable the transmission of customized avatars across the messaging platform. The avatars may be recipe based, such that a receiving client device can receive the avatar recipe and render an avatar based on the recipe. In one embodiment the recipe includes set of components and a parameters associated with the set of components. An expression identifier associated with an expression to represent via the avatar can be received via the messaging platform and an animation of the avatar can be displayed to convey the intended expression.

11 Claims, 20 Drawing Sheets

(56) References Cited

U.S. PATENT DOCUMENTS

| | | | |
|---|---|---|---|
| 8,694,899 B2 | 4/2014 | Goossens et al. | |
| 8,745,152 B2 | 6/2014 | Rapo | |
| 9,684,547 B2 | 6/2017 | Krstic et al. | |
| 9,839,844 B2 | 12/2017 | Dunstan | |
| 9,864,547 B2 | 1/2018 | Ishiguro et al. | |
| 9,930,310 B2 | 3/2018 | Lindahl et al. | |
| 2003/0045274 A1 | 3/2003 | Nishitani | |
| 2003/0187635 A1 | 10/2003 | Ramabadran | |
| 2004/0161157 A1 | 8/2004 | Sato et al. | |
| 2004/0179037 A1 | 9/2004 | Blattner | |
| 2004/0179039 A1* | 9/2004 | Blattner | H04L 51/00 715/758 |
| 2004/0250210 A1 | 12/2004 | Huang et al. | |
| 2005/0033582 A1 | 2/2005 | Gadd | |
| 2005/0264647 A1 | 12/2005 | Rzeszewski | |
| 2006/0209076 A1 | 9/2006 | Maeng | |
| 2006/0239471 A1 | 10/2006 | Mao | |
| 2007/0012167 A1 | 1/2007 | Bang | |
| 2007/0013539 A1 | 1/2007 | Choi | |
| 2007/0115349 A1 | 5/2007 | Currivan et al. | |
| 2007/0146360 A1 | 6/2007 | Clatworthy | |
| 2007/0260984 A1 | 11/2007 | Marks | |
| 2008/0147413 A1 | 6/2008 | Sobol-Shikler | |
| 2008/0231686 A1 | 9/2008 | Redlich | |
| 2008/0240461 A1 | 10/2008 | Nakamura | |
| 2008/0279272 A1 | 11/2008 | Saito | |
| 2008/0284779 A1 | 11/2008 | Gu | |
| 2008/0298705 A1 | 12/2008 | Jeong | |
| 2008/0314232 A1 | 12/2008 | Hansson | |
| 2009/0128567 A1 | 5/2009 | Shuster et al. | |
| 2009/0128657 A1 | 5/2009 | Ozluturk | |
| 2009/0212637 A1 | 8/2009 | Baarman | |
| 2009/0323984 A1 | 12/2009 | Yuassa | |
| 2010/0115022 A1* | 5/2010 | Rapo | A63F 13/12 709/203 |
| 2010/0153722 A1 | 6/2010 | Bauchot | |
| 2010/0214422 A1 | 8/2010 | Iwamura | |
| 2011/0058056 A1 | 3/2011 | Lindahl et al. | |
| 2011/0197201 A1 | 8/2011 | Yoo | |
| 2011/0248992 A1 | 10/2011 | van Os | |
| 2011/0296324 A1 | 12/2011 | Goossens | |
| 2012/0185542 A1 | 7/2012 | Vyrros et al. | |
| 2012/0270578 A1* | 10/2012 | Feghali | H04L 51/10 455/466 |
| 2013/0231924 A1 | 9/2013 | Zakarauskas | |
| 2013/0254320 A1 | 9/2013 | Bhalerao | |
| 2014/0092130 A1 | 4/2014 | Anderson et al. | |
| 2014/0152758 A1 | 6/2014 | Tong | |
| 2014/0154659 A1 | 6/2014 | Otwell | |
| 2014/0282000 A1 | 9/2014 | AlMaghlouth | |
| 2015/0156598 A1 | 6/2015 | Sun et al. | |
| 2015/0237307 A1 | 8/2015 | Fujii | |
| 2015/0347748 A1 | 12/2015 | Krstic et al. | |
| 2015/0379752 A1 | 12/2015 | Li | |
| 2016/0006987 A1 | 1/2016 | Li | |
| 2016/0042548 A1 | 2/2016 | Du et al. | |
| 2016/0072997 A1 | 3/2016 | Tsujimoto | |
| 2016/0110922 A1 | 4/2016 | Haring | |
| 2016/0361653 A1 | 12/2016 | Zhang | |
| 2017/0069124 A1 | 3/2017 | Tong | |
| 2017/0301347 A1 | 10/2017 | Fuhrman | |
| 2017/0358117 A1 | 12/2017 | Goossens et al. | |
| 2018/0089880 A1 | 3/2018 | Garrido et al. | |
| 2018/0309703 A1* | 10/2018 | Ihara | H04M 1/72552 |
| 2018/0335927 A1 | 11/2018 | Anzures | |
| 2018/0336713 A1 | 11/2018 | Avenado | |
| 2018/0336716 A1 | 11/2018 | Ramprashad | |
| 2018/0337782 A1* | 11/2018 | Wu | H04L 9/14 |
| 2019/0013036 A1 | 1/2019 | Graf | |

FOREIGN PATENT DOCUMENTS

| | | |
|---|---|---|
| WO | WO 2015/183456 | 12/2015 |
| WO | WO 2016/154800 | 10/2016 |

OTHER PUBLICATIONS

Claudia Anderson-Scimeca. "I Dream of Jeannie Blink," Oct. 23, 2011, YouTube downloaded from https://www.youtube.com/watch?v=maleyZUCwLQ, 1 page.

Complete Guide—Messenger Platform—Technical Implementation, downloaded May 27, 2016 from https://developers.facebook.com/docs/messenger-platform/implementation, 18 pages.

Getting Started—Messenger Platform downloaded May 27, 2016 from http://developers.facebook.com/docs/messenger-platform/quickstart, 6 pages.

Google launches time-saving keyboard for iPhones, May 12, 2016, 2 pages.

Introduction—Messenger Platform, downloaded Apr. 5, 2019, https://developers.facebook.com/docs/messenger-platform/introduction, 3 pages.

U.S. Appl. No. 12/556,380 Advisory Action dated Dec. 13, 2012, 2 pages.

U.S. Appl. No. 12/556,380 Corrected Notice of Allowance dated Jan. 18, 2018, 13 pages.

U.S. Appl. No. 12/556,380 Final Office Action dated Dec. 17, 2013, 28 pages.

U.S. Appl. No. 12/556,380 Final Office Action dated Feb. 20, 2015, 33 pages.

U.S. Appl. No. 12/556,380 Final Office Action dated Sep. 21, 2012, 20 pages.

U.S. Appl. No. 12/556,380 Notice of Allowance dated Jan. 18, 2018, 6 pages.

U.S. Appl. No. 12/556,380 Notice of Allowance dated Dec. 15, 2017, 9 pages.

U.S. Appl. No. 12/556,380 Office Action dated Mar. 28, 2012, 17 pages.

U.S. Appl. No. 12/556,380 Office Action dated Jun. 7, 2013, 22 pages.

U.S. Appl. No. 12/556,380 Office Action dated Jul. 2, 2014, 30 pages.

International Search Report and Written Opinion from PCT/US2017/034340, dated Jul. 19, 2017, 10 pages.

Partial European Search Report from 17174969.0, dated Jul. 26, 2017, 13 pages.

U.S. Appl. No. 62/399,048, filed Jun. 12, 2016.
U.S. Appl. No. 62/399,241, filed Sep. 23, 2016.
U.S. Appl. No. 62/507,177, filed May 16, 2017.
U.S. Appl. No. 62/556,412, filed Sep. 9, 2017.
U.S. Appl. No. 62/557,121, filed Sep. 11, 2017.

Valentini et al., "Sonify Your Face: Facial Expressions for Sound Generation," Proceedings of the 18th ACM International Conference on Multimedia, Oct. 25-29, 2010, pp. 1363-1372.

International Preliminary Report on Patentability from PCT/2019/019554, dated Sep. 10, 2020, 7 pages.

* cited by examiner

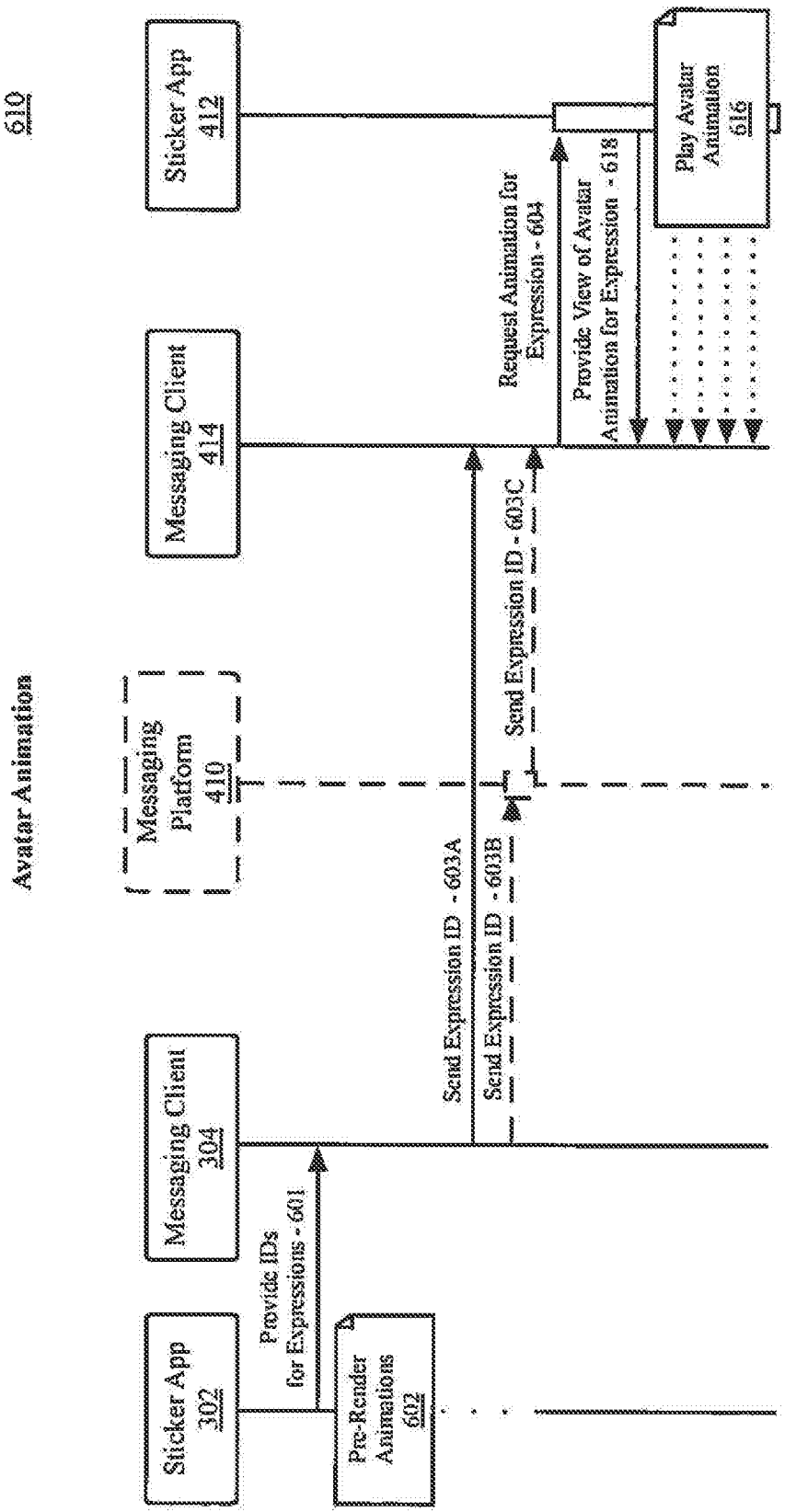

CUSTOMIZED AVATARS AND ASSOCIATED FRAMEWORK

CROSS-REFERENCE TO RELATED APPLICATIONS

This application is a continuation of U.S. patent application Ser. No. 15/274,518 entitled "CUSTOMIZED AVATARS AND ASSOCIATED FRAMEWORK," filed on Sep. 23, 2016, which claims benefit of U.S. Provisional Application No. 62/349,048 entitled "CUSTOMIZED AVATARS AND ASSOCIATED FRAMEWORK," filed on Jun. 12, 2016, the entireties of which are incorporated herein by reference.

BACKGROUND OF THE DISCLOSURE

Portable electronic devices have been developed that support the use of emoji characters. Emoji characters are often used in web forums, email messages, instant messages (e.g., SMS text messages), notes and on-line games. While emoji characters may be used to convey a variety of expression, the characters are standardized and generally may not be tailored to a specific u ser.

SUMMARY OF THE DESCRIPTION

Various embodiments provide for techniques to facilitate online communication over a messaging platform. In one embodiment, the online communication is facilitated by providing a framework to enable the transmission of three dimensional avatars across the messaging platform. The avatars may be recipe based, such that a receiving client device can receive the avatar recipe and render an avatar based on the recipe. In one embodiment the recipe includes set of components and parameters associated with the set of components. An expression identifier associated with an expression to represent via the avatar can be received via the messaging platform and an animation of the avatar can be displayed to convey the intended expression.

One embodiment provides for a non-transitory machine readable medium storing instructions which, when executed by one or more processors, cause the one or more processors to perform operations facilitating online communication via a messaging platform, the operations comprising receiving, via a online communication channel established for online communication, a first recipe for a customized avatar, the first recipe including a set of components and a parameters associated with the set of components; rendering the customized avatar based on the first recipe received via the online communication channel, the rendering based on the set of components and associated parameters; receiving, via the online communication channel, an expression identifier associated with an expression to represent via the customized avatar; rendering an animation for the customized avatar based on the expression identifier; and displaying the rendered animation for the avatar within a transcript of the online communication.

One embodiment provides for a system comprising a non-transitory machine readable storage device to store instructions and one or more processors to execute the instructions. The instructions, when executed, cause the one or more processors to provide a framework to enable definition of a recipe for a customized avatar, the recipe to identify an asset in a set of pre-defined assets for use in to render elements of the avatar; determine if a receiving client connected via a online communication channel established for online communication supports a rendering an avatar based on the recipe; and transmit the recipe via the online communication channel to the receiving client in response to a determination that the receiving client supports the recipe, the receiving client to render the avatar based on the recipe and display the avatar in a transcript of the online communication.

Other features of the present invention will be apparent from the accompanying drawings and from the detailed description, which follows.

The above summary does not include an exhaustive list of all aspects of the present invention. It is contemplated that the invention includes all systems and methods that can be practiced from all suitable combinations of the various aspects summarized above, and also those disclosed in the Detailed Description below.

BRIEF DESCRIPTION OF THE DRAWINGS

The present invention is illustrated by way of example, and not limitation, in the figures of the accompanying drawings in which like references indicate similar elements, and in which:

FIG. 6A-6B are a sequence diagrams of avatar animation processes according to embodiments;

DETAILED DESCRIPTION

Figure 1:
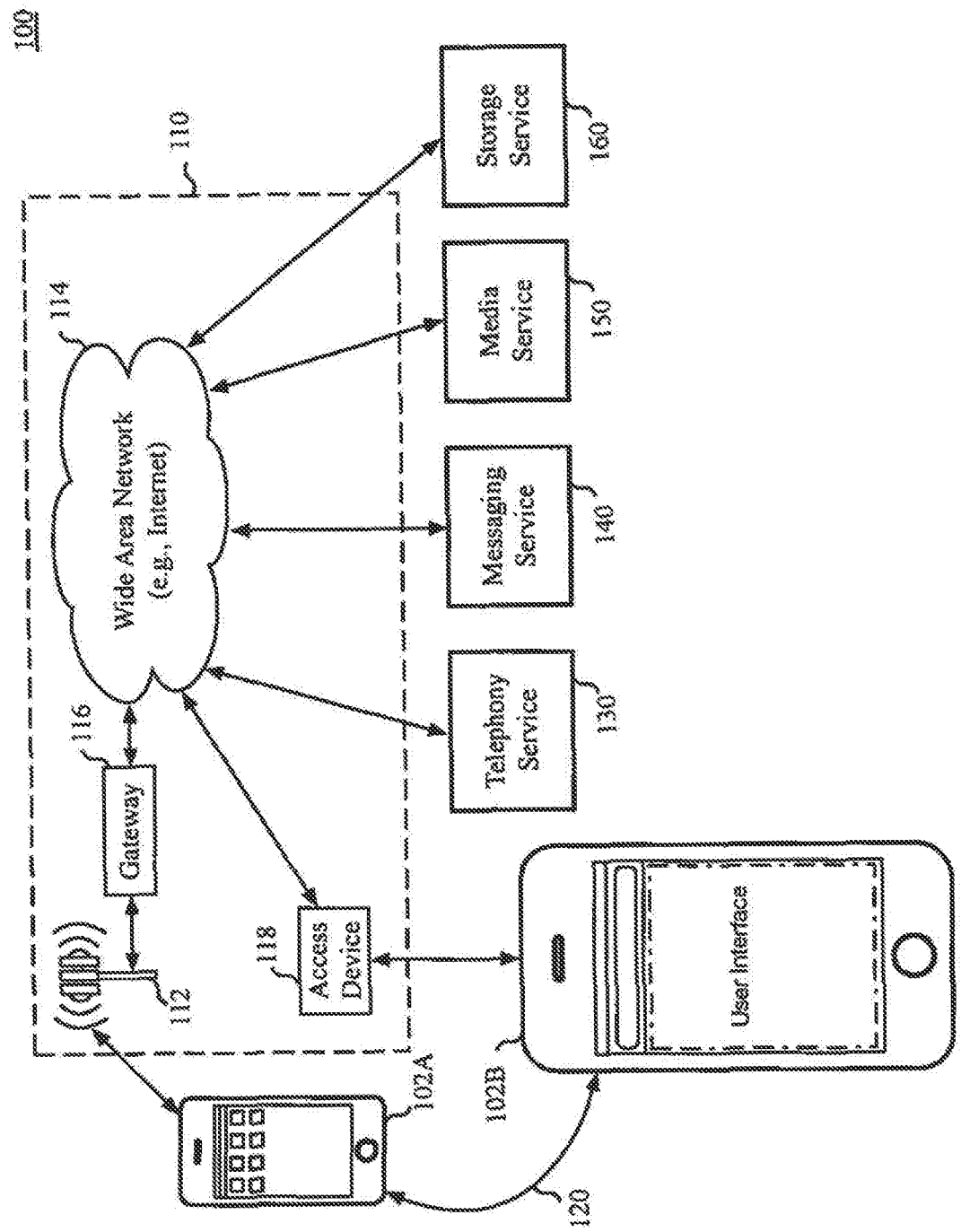
FIG. 1 is a block diagram of an example network operating environment for mobile devices, according to an embodiment.

Embodiments described herein provide a system and method of transmitting and viewing a recipe that defines the features of a three dimensional (3D) avatar. In one embodiment the 3D avatar can be created from one or more images of a user. The avatar system is provided as a framework to which applications can connect and interact to define, edit, and transmit 3D avatars. The framework can connect a generator/editor application that is used to create or edit the recipe for a 3D avatar with an online communication and/or instant messaging platform that can be used to send the avatar to convey one of a set of pre-defined emotions.

The avatar framework can enable the creation of 3D animated stickers for use in the online communication platform. The 3D animated stickers can be messaged or otherwise placed on an online communication transcript. The avatar recipe is sent as binary data over the messaging platform and is rendered by the receiving platform. Once an avatar is created, the avatar can be associated with a set of animations to convey emotions. The emotions can be associated with an identifier. Sending an emotion identifier associated with a recipe can enable the animation of the avatar to convey the identified emotion, which enables the avatar to be used as a 3D animated emoji.

Additional details as to embodiments of the avatar framework and associated implementations are described herein. As described herein, 3D or three dimensional describes content that is generated from geometric vertex data by a 3D rendering application programming interface (API), or any other content that is intended to convey a three-dimensional image, whether or not the image is displayed via a three-dimensional or two-dimensional display.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software (as instructions on a non-transitory machine-readable storage medium), or a combination of both hardware and software. Although the processes are described below in terms of some sequential operations, it should be appreciated that some of the operations described may be performed in a different order. Moreover, some operations may be performed in parallel rather than sequentially.

A portion of this disclosure contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. Copyright 2016 Apple Inc.

FIG. 1 is a block diagram of an example network operating environment 100 for mobile devices, according to an embodiment. Mobile device 102A and mobile device 102B can, for example, communicate over one or more wired and/or wireless networks 110 to perform data communication. For example, a wireless network 112, e.g., a cellular network, can communicate with a wide area network 114, such as the Internet, by use of a gateway 116. Likewise, an access device 118, such as a mobile hotspot wireless access device, can provide communication access to the wide area network 114.

In some implementations, both voice and data communications can be established over the wireless network 112 and/or the access device 118. For example, mobile device 102A can place and receive phone calls (e.g., using VoIP protocols), send and receive e-mail messages (e.g., using POP3 protocol), and retrieve electronic documents and/or streams, such as web pages, photographs, and videos, over the wireless network 112, gateway 116, and wide area network 114 (e.g., using TCP/IP or UDP protocols). In some implementations, mobile device 102A can place and receive phone calls, send and receive e-mail messages, and retrieve electronic documents over the access device 118 and the wide area network 114. In some implementations, mobile device 102A or mobile device 102B can be physically connected to the access device 118 using one or more cables and the access device 118 can be a personal computer. In this configuration, mobile device 102A or mobile device 102B can be referred to as a "tethered" device.

Mobile device 102A or mobile device 102B can communicate with one or more services, such as a telephony service 130, a messaging service 140, a media service 150, and a storage service 160 over the one or more wired and/or wireless networks 110. For example, the telephony service 130 can enable telephonic communication between mobile device 102A and mobile device 102B, or between a mobile device and a wired telephonic device. The telephony service 130 can route voice over IP (VoW) calls over the wide area network 114 or can access a cellular voice network (e.g., wireless network 112). The messaging service 140 can, for example, provide e-mail and/or other messaging services. The media service 150 can, for example, provide access to media files, such as song files, audio books, movie files, video clips, and other media data. A storage service 160 can provide network storage capabilities to mobile device 102A and mobile device 102B to store documents and media files. Other services can also be provided, including a software update service to update operating system software or client software on the mobile devices.

Mobile device 102A or 102B can also access other data and content over the one or more wired and/or wireless networks 110. For example, content publishers, such as news sites, RSS feeds, web sites, blogs, social networking sites, developer networks, etc., can be accessed via a web browser as described herein. For example, mobile device 102A and/or mobile device 102B can execute browser software to access web sites provided by servers accessible via the wide area network 114.

Embodiments described herein provide a framework to enable transmission of animated 3D avatars to facilitate online communication via the messaging service 140, or an equivalent service, medium, or platform that enables text, quasi-text, or enhanced text based communication to be performed in a synchronous or quasi-synchronous manner. In one embodiment the messaging service 140 is the iMessage® messaging service provide by Apple Inc. of Cupertino Calif. The transmission of animated avatars can be performed by client devices connected to the messaging service 140, or between a first client device connected with the messaging service 140 and a second client device connected to a different messaging service. In the case of differing messaging services, an image or animated image of the avatar can be generated by the first client device and sent to the second client device, for example, via the Multimedia Messaging Service (MMS). Where the sending client device and receiving client device are both on the messaging service 140, a recipe for the avatar can be sent to minimize the amount of information required to traverse the network between the devices. To animate the avatar, an expression ID can be sent between devices and the receiving device can animate the avatar based on the expression ID.

Figure 2:
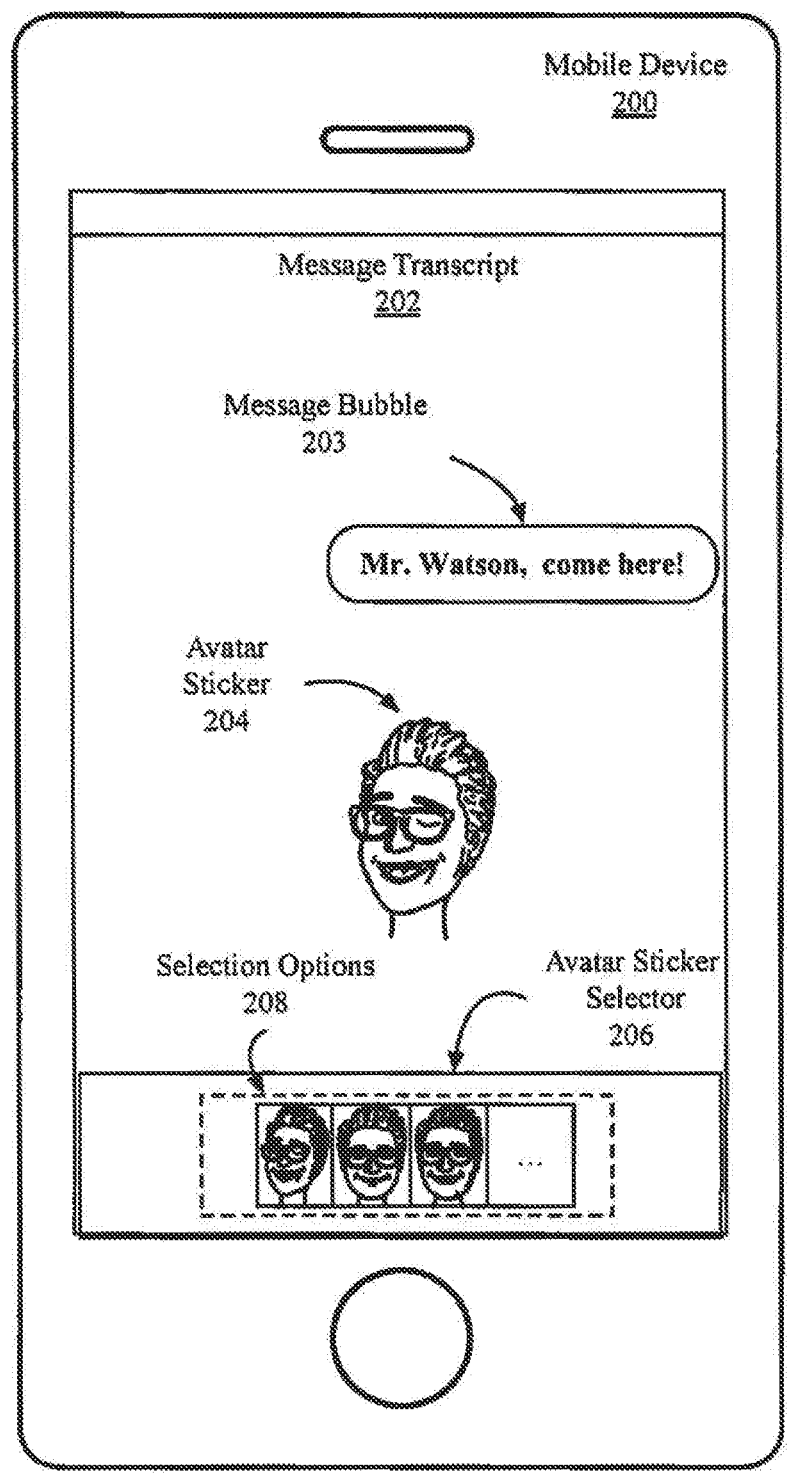
FIG. 2 is an illustration of a mobile device, according to an embodiment.

FIG. 2 is an illustration of a mobile device 200, according to an embodiment. In one embodiment the mobile device 200 can include a messaging application that displays a message transcript 202 of messages communicated between participants in online communication via the messaging application. The messaging application can be a text or enhanced text messaging platform that facilitates communication between users of the client device by enabling the transmission of text and/or multi-media data between client devices. In one embodiment the avatar framework enables an avatar generation and management application to plug-in to the messaging application. An exemplary avatar generation and management application is a sticker application (e.g., sticker app) that enables the generation, management, and editing of 3D avatars. In one embodiment the 3D avatars may be generated from a set of images of a user.

Once generated, a 3D avatar may be applied as a sticker within any application having support for the avatar framework. For example, an avatar sticker 204 can be placed within the message transcript 202 of a messaging application. In one embodiment, a set of 3D avatars and/or animations can be presented for selection via an avatar sticker selector 206. The avatar sticker selector 206 can include multiple selection options 208 associated with 3D avatars and 3D avatar animation. In one embodiment the avatar sticker selector 206 is enabled via a system plug-in provide by the avatar sticker app. In one embodiment the avatar sticker selector is enabled via the avatar framework and enables the sticker application to render a user interface view for the avatar sticker selector 206. The rendered user interface view containing the avatar sticker selector 206 can be displayed by the messaging application.

In response to receiving a selection of one of the multiple selection options 208, the messaging application can place a selected 3D avatar or avatar animation at a position within the message transcript. The position can be associated with the most recent message displayed on the transcript. In one embodiment a free-form selection can be enabled in which the avatar sticker 204 can be selectively placed at any position within the message transcript 202. For example, an avatar sticker 204 may be placed on a message bubble 203 within the message transcript 202. In one embodiment, the avatar sticker 204 may be placed at a specific point in the message transcript and will scroll along with the other message elements in the message transcript. In one embodiment, for animated avatars, animation may temporarily cease during a scroll operation and resume once scrolling is complete.

In one embodiment the placement of the avatar sticker 204 can be adjusted after initial placement and before sending the avatar sticker or a message associated with the avatar sticker to a receiving client. The avatar sticker 204 can be scaled or rotated before transmission and the scale, rotation, and/or orientation of the avatar sticker 204 can be stored in metadata that is transmitted with the avatar sticker 204.

Figure 3A:
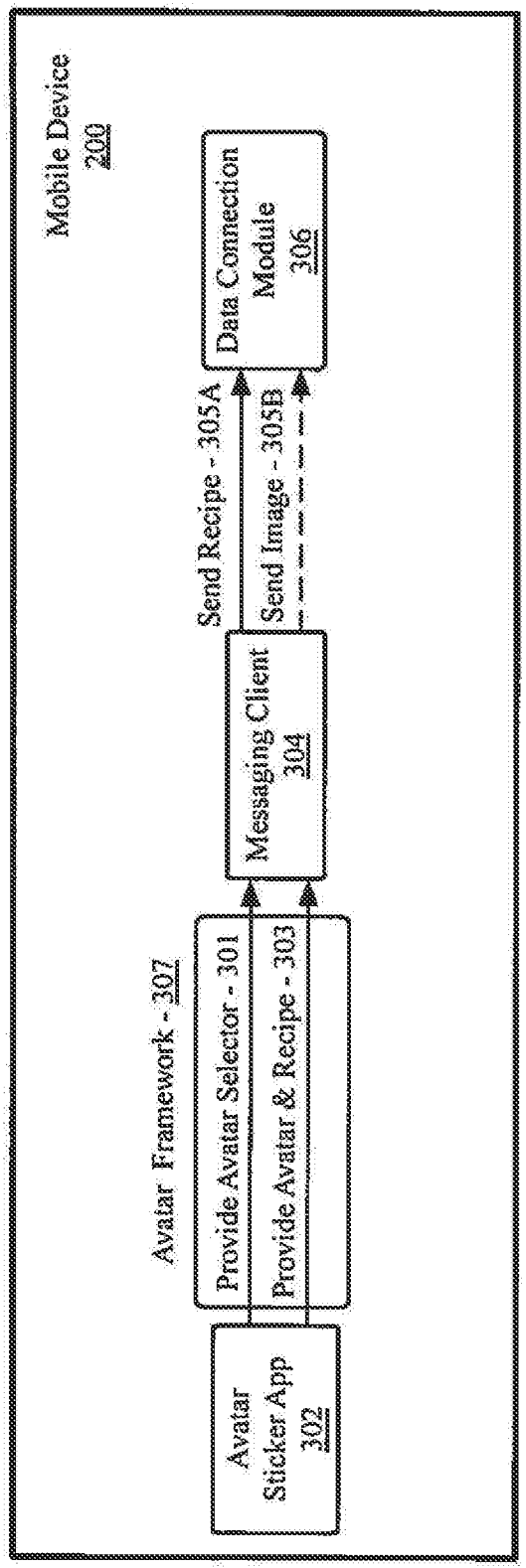
FIGS. 3A-3B are illustrations of avatar display systems, according to embodiments.
Figure 3B:
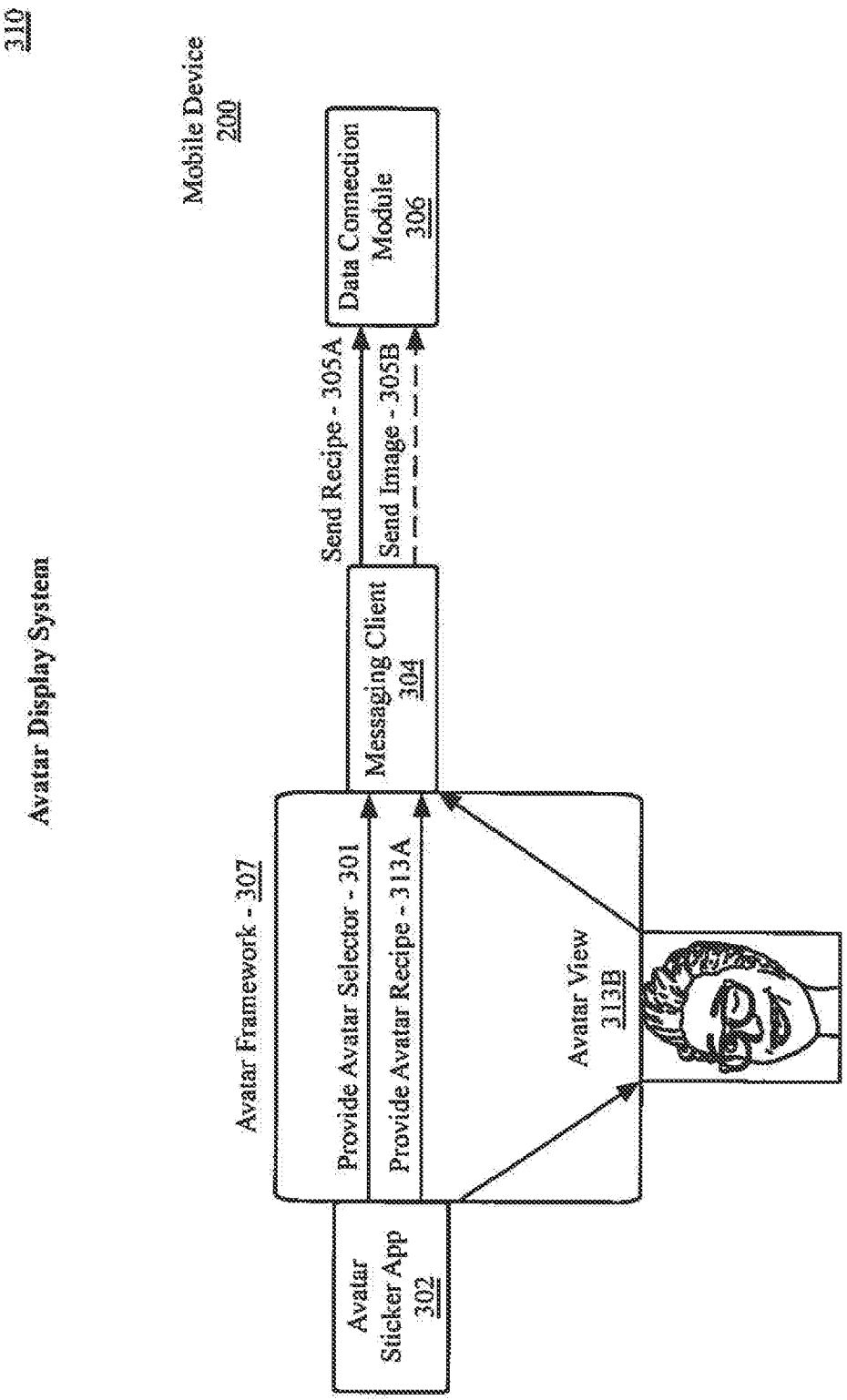

FIGS. 3A-3B are illustrations of avatar display systems 300, 310, according to embodiments. As shown in FIG. 3A, one embodiment provides for an avatar display system 300 that enabled by an avatar framework 307. The avatar framework 307 may be a messages API that enables communications between an avatar sticker app 302 and a messaging client 304. In one embodiment, the avatar framework 307 is a library that enables inter-process communication between the avatar sticker app 302 and the messaging client 304. While some operations are illustrated as occurring in separate processes, with the avatar sticker app 302 being a separate process from the messaging client 304, in one embodiment the messaging client 304, via the avatar framework 307, can load portions of the avatar sticker app 302 as a library and perform operations of the avatar sticker app 302, the messaging client 304, and the avatar framework 307 within a single process.

The messaging client 304 can execute as an application on the mobile device 200 and can be associated with the message transcript 202 of FIG. 2. To enable the viewing of an avatar via the messaging client 304, the avatar sticker app 302 can provide (301) an avatar selector to the messaging client 304. The avatar selector 301 can enable a user to select an avatar or an animation associated with the avatar, for example, as with the avatar sticker selector 206 of FIG. 2. For example, the avatar sticker app 302 can enable a selection of one of the selection options 208 of the avatar sticker selector 206 of FIG. 2. In one embodiment, the avatar selector 301 can be provided via a user interface object that is displayed via the messaging client 304 but is controlled via the avatar sticker app 302. In such embodiment, a selection of an avatar via the avatar selector is processed by the avatar sticker app 302.

In response to a selection of an avatar or animation via the avatar selector, the avatar sticker app 302 can provide (303) an avatar and/or an avatar recipe to the messaging client 304. In one embodiment the avatar is provided to the messaging client 304 as an image or an animated image. The image or animated image of the avatar can then be displayed by the messaging client 304.

In various embodiments, transmission of a 3D avatar differs based on whether the recipient client device supports recipe based avatars. Where the recipient device supports recipe based avatars, the avatar sticker app 302 can provide a recipe for the avatar to the messaging client 304 and the messaging client 304 can send the recipe (305A) to a recipient client device via a data connection module 306 of the mobile device. Where the recipient device does not support recipe based avatars, or does not include the current assets necessary to render the recipe of an avatar, the avatar sticker app 302 can generate an animated image, such as an animated portable network graphics (APNG) image. The messaging client 304 can then send the image or animated image (305B) to send to a recipient device via the data connection module 306.

As shown in FIG. 3B, one embodiment provides for an avatar display system 310 in which the avatar framework 307 enables display of an avatar via a view object. In such embodiment, the avatar sticker app 302 can create and view object that is displayed via the messaging client 304. The avatar sticker app 302 can provide an avatar recipe 313A for a created avatar to the messaging client and also provide a separate avatar view object 313B through which the avatar sticker app 302 can display a rendering of the avatar and/or avatar animation within the messaging client 304. The avatar view object 313B is a user interface object that can draw itself within a rectangular area of a window. Such objects can respond to user actions such as finger taps or mouse clicks. Using the view object, the avatar sticker app 302 can draw a rendering of the avatar that can be displayed by the messaging client 304, while enabling the avatar sticker apps to respond to touches and input from devices.

Figure 4:
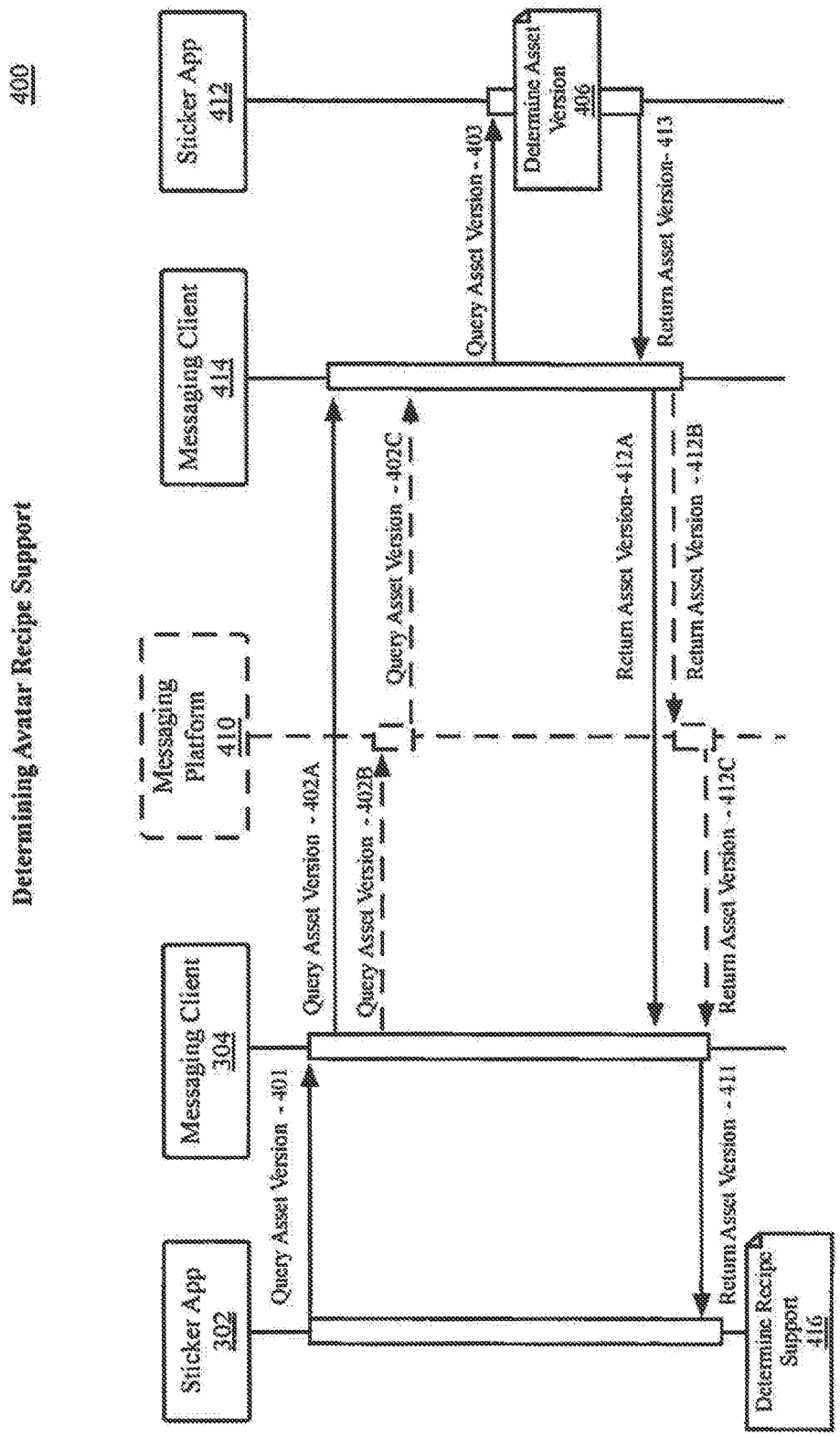
FIG. 4 is a sequence diagram of a process of determining avatar recipe support, according to an embodiment.

FIG. 4 is a sequence diagram of a process 400 of determining avatar recipe support, according to an embodiment. In one embodiment, determination of whether a messaging client supports a recipe based avatar can be performed before sending an avatar to a receiving client. In one embodiment avatars recipes are rendered from a set of pre-loaded assets. When using pre-loaded assets, even if the receiving client device supports avatar rendering from a provided recipe, if a receiving client device does not contain a required version of the assets used to render the avatar, recipe based rendering may not be supported. To determine if a receiving client device supports recipe based rendering, the process 400 of determining avatar recipe support can be performed.

In one embodiment the sticker app 302, to determine whether to send a recipe or an animated image, can send a request (401) to an associated messaging client 304 to query an asset version. The messaging client can send, relay, or re-transmit a request to query an asset version to a receiving messaging client 414 on a receiving client device. In the event peer to peer (P2P) communication is enabled between messaging client 304 and messaging client 414, messaging client 304 can send a request (402A) to query an asset version directly to the receiving messaging client 414. If P2P communication is not configured or enabled, messaging client 304 can send a request (402B) to query the asset version via messaging platform 410. The messaging platform 410 can receive the request from messaging client 304 and relay a request (402C) to the query an asset version to messaging client 304.

In various embodiments, the messaging platform 410 can be used in the event P2P communication cannot be established between messaging client 304 and messaging client 414. The messaging platform 410, in one embodiment, is a message relay that is used in the event that messaging client 304 and messaging client 414 are on the same messaging platform but P2P communication cannot be established. In one embodiment the messaging platform 410 is a short message service (SMS) gateway between the messaging service of the messaging client 304, to enable messaging client 304 to send an SMS message to messaging client 414. In one embodiment the messaging platform 410 can be a Multimedia Messaging Service store and forward server used to relay MMS messages.

In response to a request (e.g., request 402A or request 402C) to query an asset version for the avatar framework, messaging client 414 can send a request (403) to query the asset version used by the installed avatar sticker app 412. The sticker app 412 can determine (406) the installed asset version and return (413) the installed asset version to messaging client 414. Messaging client 414 can directly return (412A) the asset version over the P2P communication channel or return the asset version to messaging client 304 via the messaging platform 410 (e.g., return 412B, return 412C). Messaging client 304 can return (411) the asset version to sticker app 302. Based on the returned asset version, sticker app 302 can determine (416) whether recipe based avatars may be sent to messaging client 414.

In one embodiment Sticker app 302 can determine (416) recipe support for avatars sent to messaging client 414 by comparing the asset version returned by messaging client 414 with the asset version supported by sticker app 302 to determine if the versions are the same. In such embodiment, if the version numbers do not match, avatar recipes cannot be sent to messaging client 414. In one embodiment it is possible for a version mismatch to occur and recipe based avatars can still be supported. For example, the differences between different asset versions may not affect the avatars that have been created by sticker app 302 for messaging client 304. In such embodiment, recipe based avatars can still be supported in the event the asset version supported by sticker app 302 and/or messaging client 304 are different but at least in part compatible with the asset versions supported by sticker app 412 and/or messaging client 414.

Figure 5:
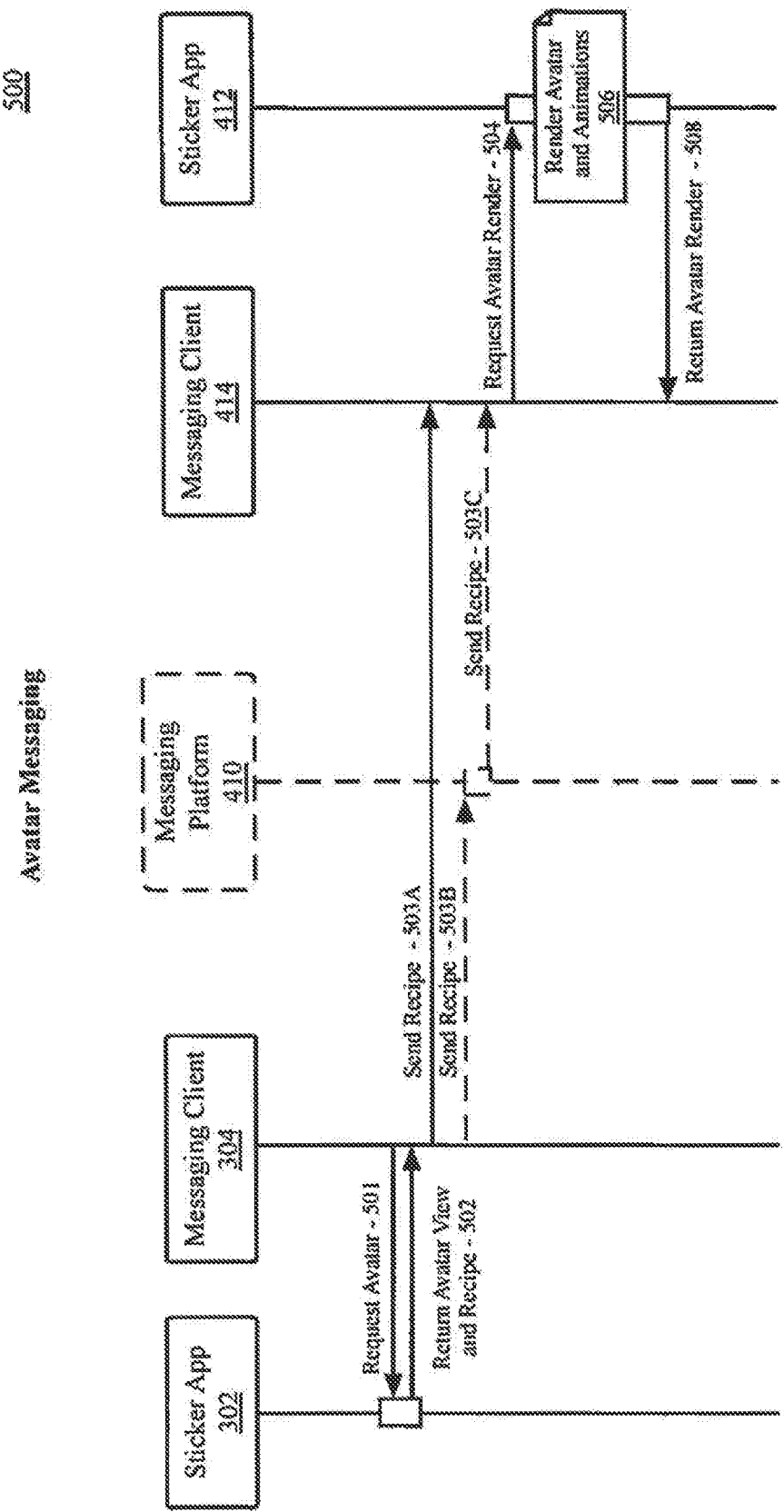
FIG. 5 is a sequence diagram of a process of recipe based avatar messaging, according to an embodiment.

FIG. 5 is a sequence diagram of a process 500 of recipe based avatar messaging, according to an embodiment. In one embodiment, messaging client 304 can send a message (501) including an avatar request to sticker app 302 via the avatar framework API. The message (501) can be sent, for example, in response to receiving a selection of an avatar from the selection options 208 of an avatar sticker selector 206 as in FIG. 2. Sticker app 302, in response to the message (501) including the avatar request, can return (502) an avatar view and a recipe to messaging client 304. In one embodiment the avatar view enables sticker app 302 to display a rendering of the avatar or an animation of the avatar within the messaging client 304.

The avatar can be sent via a message from messaging client 304 to messaging client 414. If messaging client 414 supports recipe based avatar using the avatar asset version used by sticker app 302 and/or messaging client 304, messaging client 304 can send the recipe to messaging client 414. If P2P communication is enabled, messaging client 304 can send (503A) a message including the recipe directly to messaging client 414. If P2P communication is not enabled, messaging client 304 can send (503B) the recipe via the messaging platform 410, which can send (503C) (e.g., relay) the recipe to messaging client 414. The relay via the messaging platform 410 can occur as described with respect to FIG. 4.

Messaging client 414, having received the recipe, can request (504) sticker app 412, via the avatar framework API, to render the avatar based on the recipe. Sticker app 412 can perform a set of operations (506) to render the avatar based on the recipe. Sticker app 412 can then return (508) an avatar render to messaging client 414, which can then display the avatar in a message transcript. In one embodiment the avatar render is returned as an image or an animated image that can be displayed by messaging client 414. In one embodiment the avatar render may be returned as a user interface view object controlled by sticker app 412.

Figure 6A:
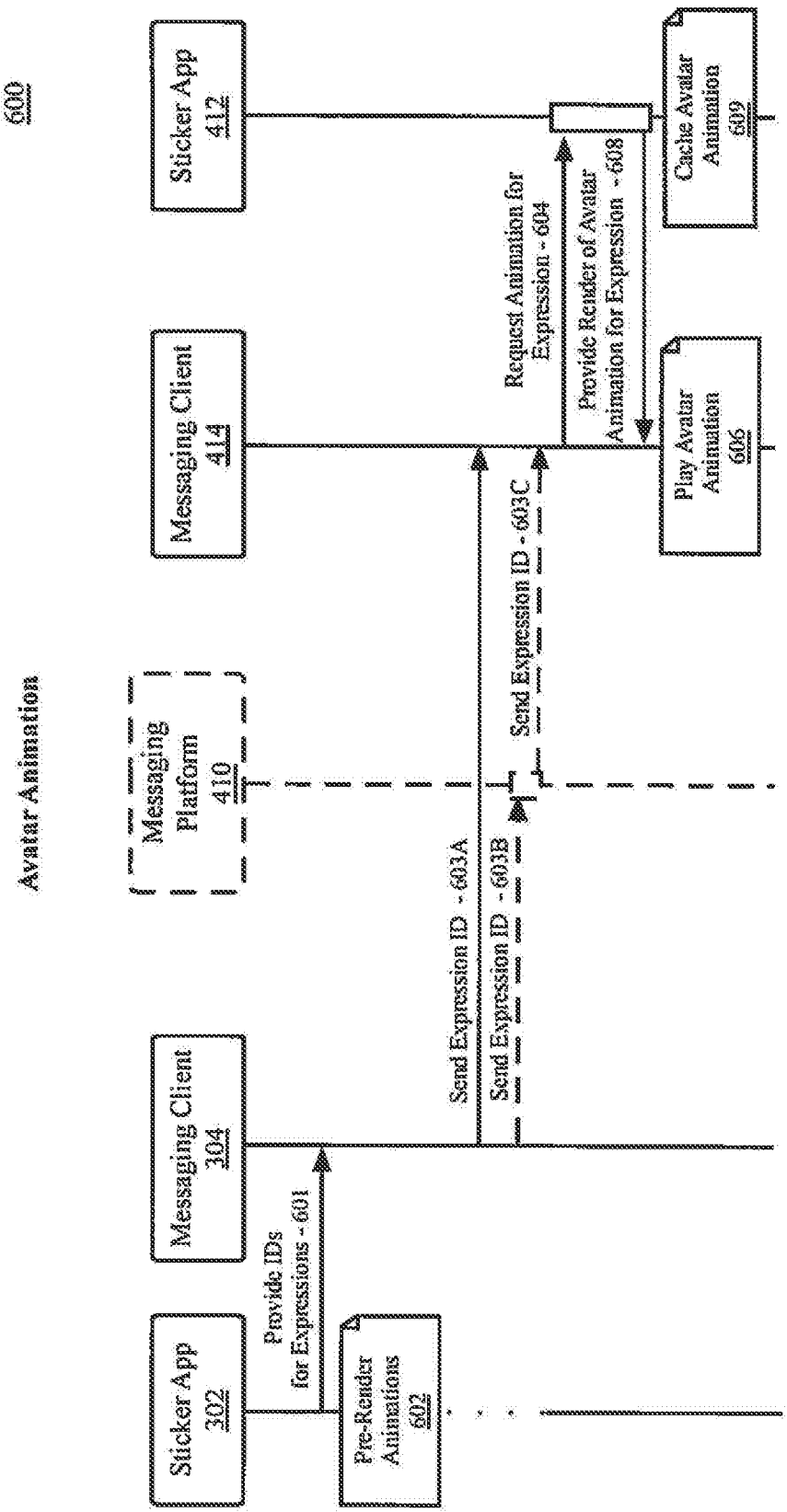

FIGS. 6A-6B are sequence diagrams of processes 600, 610 of animating an avatar to convey an expression, according to embodiments. FIG. 6A is a sequence diagram of a process 600 of avatar animation, according to one embodiment. In such embodiment, during a handshake or initialization process, sticker app 302 can provide (601) messaging client 304 with a set of expression identifiers associated with animations of an avatar that may be performed to convey expressions. The expressions can be concepts and/or emotions, such as the concepts or emotions that may be conveyed via an emoticon or an emoji. Due to the custom nature of the avatars, the animated expressions that may be displayed via the avatar framework and/or avatar sticker applications can provide an enhanced form of expression over techniques known in the art.

In one embodiment, for avatars generated by the sticker app 302, the sticker app can pre-render (602) animations for all available expressions. The set of expressions that may be conveyed via an animation of the avatar can be pre-defined, although the set of expressions can be increased or adjusted in successive updates of the avatar framework. The set of animations for the avatar expressions can be pre-rendered to reduce expression latency, such that for any expression that may be conveyed via an animation of the avatar, an animation for the expression is available to be displayed immediately when an animation request is received. In one embodiment, the set of expressions that may be presented via an avatar animation is shown in Table 1.

TABLE 1

Exemplary Avatar Expression Identifiers

```
message Expressions {
    ExpressionKiss = 0,
    ExpressionLaugh = 1,
    ExpressionLove = 2,
    ExpressionNo = 3,
    ExpressionRage = 4,
    ExpressionSad = 5,
    ExpressionSleepy = 6,
    ExpressionSmile = 7,
    ExpressionSurprise = 8,
    ExpressionWhatever = 9,
    ExpressionWink = 10
}
```

In one embodiment, messaging client 304 can send an expression ID to messaging client 314, either via a direct message (603A) to messaging client 304 or by sending a message (603B) to the messaging platform 410 for relay (603C) to messaging client 414. Messaging client 414 can then request (604), via the avatar framework, for an animation for the expression to be provided by sticker app 412. Sticker app 412 can then provide (608) a render of the avatar to messaging client 414 in the form of an animated image. Messaging client 414 can display the animated image of the avatar animation. Additionally, one embodiment enables an expression ID to be sent with an avatar recipe, such that the initial display of the avatar is animated. In one embodiment, an animated image of the avatar animation is provided to messaging client 414. Messaging client 414 can then play (606) the animated image for the avatar expression. In one embodiment, when sticker app 412 generates an animation of an avatar based on a received expression ID, sticker app 412 can cache (609) the avatar animation for later use. In the event the avatar animation is to be re-played, the cached animation can be retrieved.

FIG. 6B is a sequence diagram of an additional process 610 of avatar animation, according to an embodiment. As an alternative to sticker app 412 providing a render of an avatar animation for an expression as in process 600, one embodiment provides for a process 610 in which sticker app 412 can provide (618) a view object through which an avatar animation for an expression can be displayed. In such embodiment, sticker app 412 can provide (618) a view object to messaging client 414. Messaging client 414 can display the view object, for example in a message transcript. Sticker app 412 can then play (616) an avatar animation for the expression via the view object, which will be visible via the messaging client 414. While sticker app 412 can provide (618) a view of the avatar animation, in one embodiment, sticker app 412 can also animate the avatar via an existing view through which a static rendering of the avatar is displayed.

Figure 7:
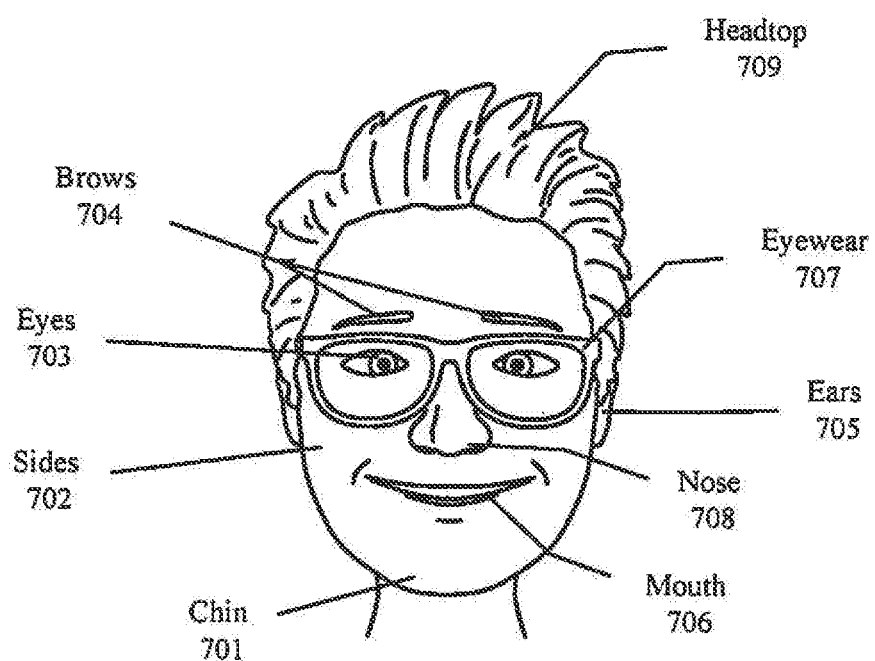
FIG. 7 is an illustration of an avatar and associated avatar recipe elements, according to an embodiment.

FIG. 7 is an illustration of an avatar and associated avatar recipe elements 700, according to an embodiment. In one embodiment, up to recipe elements are specified for an avatar and the avatar can be rendered and/or animated based on the recipe elements. The number and type of elements specified for an avatar can vary among embodiments, and some embodiments can use greater than or fewer than the illustrated avatar recipe elements 700.

In one embodiment, as illustrated in FIG. 7, avatar recipe elements include elements to specify a chin 701, sides 702, eyes 703, brows 704, ears 705, mouth 706, eyewear 707, nose 708, and headtop 709 (e.g., hat, hair, etc.). In one embodiment the illustrated avatar recipe elements 700 can be used as animation rigs to animate the avatar to convey an expression. In one embodiment, additional elements (not shown) can be used to further define an avatar. The additional elements can be used to further define facial features of the avatar or other descriptive elements, such as an age of an individual whom the avatar is to represent. In one embodiment an avatar can be described using a recipe as in Table 2.

TABLE 2

Exemplary Avatar Recipe Message Data Structure

```
message Avatar {
    int32 versions = 1;
    int32 min version = 2;
    Colors colors = 4;
    Parameters parameters = 5;
    Rigs rigs = 6;
    FacialFeatures facialFeatures = 7;
    Components components = 8;
}
```

The avatar recipe message of Table 1 defines version numbers associated with the avatar as well as a minimum version number associated with the assets used to render the avatar. The data structure elements associated with colors, parameters, rigs, facial features and components references additional data structures that include data to further define the avatar recipe. Exemplary parameters associated with an avatar are shown in Table 3.

TABLE 3

Exemplary Avatar Parameters Data Structure

```
message Parameters {
    int32 browsThickness = 1;
    int32 upperLipThickness = 2;
    int32 eyeRoundness = 3;
    int32 nosesharpness = 4;
    int32 noseDirection = 5;
    int32 hairorientation = 6;
    int32 hairsideLength = 7;
    int32 hairTopLength = 8;
}
```

In one embodiment the values associated with the parameters are used to select from a set of pre-defined, pre-loaded assets. The selected assets can be used when rendering an avatar. Some of the parameters can also define a set of transformations to apply to certain assets when rendering an avatar. The parameters can be used in conjunction with values defining asset components. An exemplary avatar component data structure is shown in Table 4.

TABLE 4

Exemplary Avatar Components Data Structure

```
message Components {
    optional component face = 1;
    optional component eyebrow = 2;
    optional component makeup = 3;
    optional component iris = 4;
    optional component facialHair = 5;
    optional component hair = 6;
    optional component eyewear = 7;
    optional component hat = 8;
    optional component clothes = 9;
    optional component age = 10;
}
```

In one embodiment the values associated with the components can be used to select assets used to render an animate an avatar. In some instances, the components can define transformations to apply to certain assets when rendering or animating an avatar.

Figure 8:
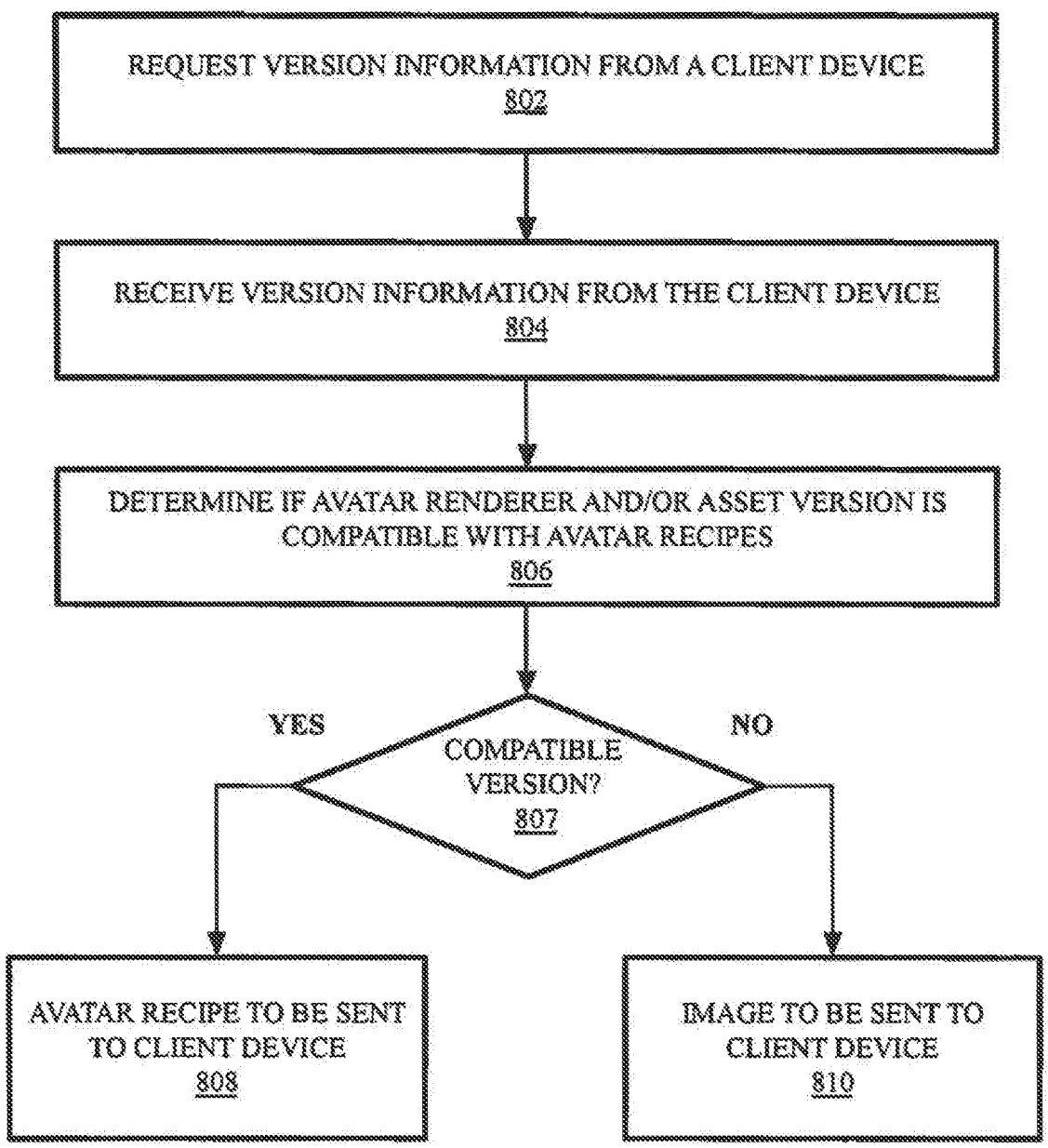
FIG. 8 is a flow diagram of avatar handshake logic, according to an embodiment.

FIG. 8 is a flow diagram of avatar handshake logic 800, according to an embodiment. The avatar handshake logic 800 can be used to determine if a message application of a receiving client device includes sufficient or sufficiently up to date avatar framework support to enable the rendering of an avatar or animation based on a supplied recipe and/or expression ID.

In one embodiment the avatar handshake logic 800 can request version information from a client device, as shown at 802. In response to the request at 802, the avatar handshake logic 800 can receive version information from the client device at 804. The request and receipt of the version information can be performed via the process 400 of determining avatar recipe support illustrated in FIG. 4.

The avatar handshake logic 800 use the received version information to determine, at 806, if the avatar renderer and/or asset version at the client device is compatible with avatar recipes which may be sent to the client device. If at 807 the version information indicates that the client device includes an avatar renderer and assets compatible with the avatar recipes to be sent, the avatar handshake logic 800 can determine, at 808, that an avatar recipe is to be sent to the client device. In one embodiment, a flag associated with the client device can be set that indicates that recipe information may be sent for avatars.

If at 807 the version information indicates that the client device includes an avatar renderer or assets that are not compatible with the avatar recipes to be sent, the avatar handshake logic 800 can determine, at 810, that an image is to be sent to the client device to convey the avatar. The image can be a still image of various image formats, such as the portable network graphics (PNG) format. For animated avatars, an animated image can be sent, such as an animated image in the APNG format, although any suitable image or animated image format may be used.

Figure 9:
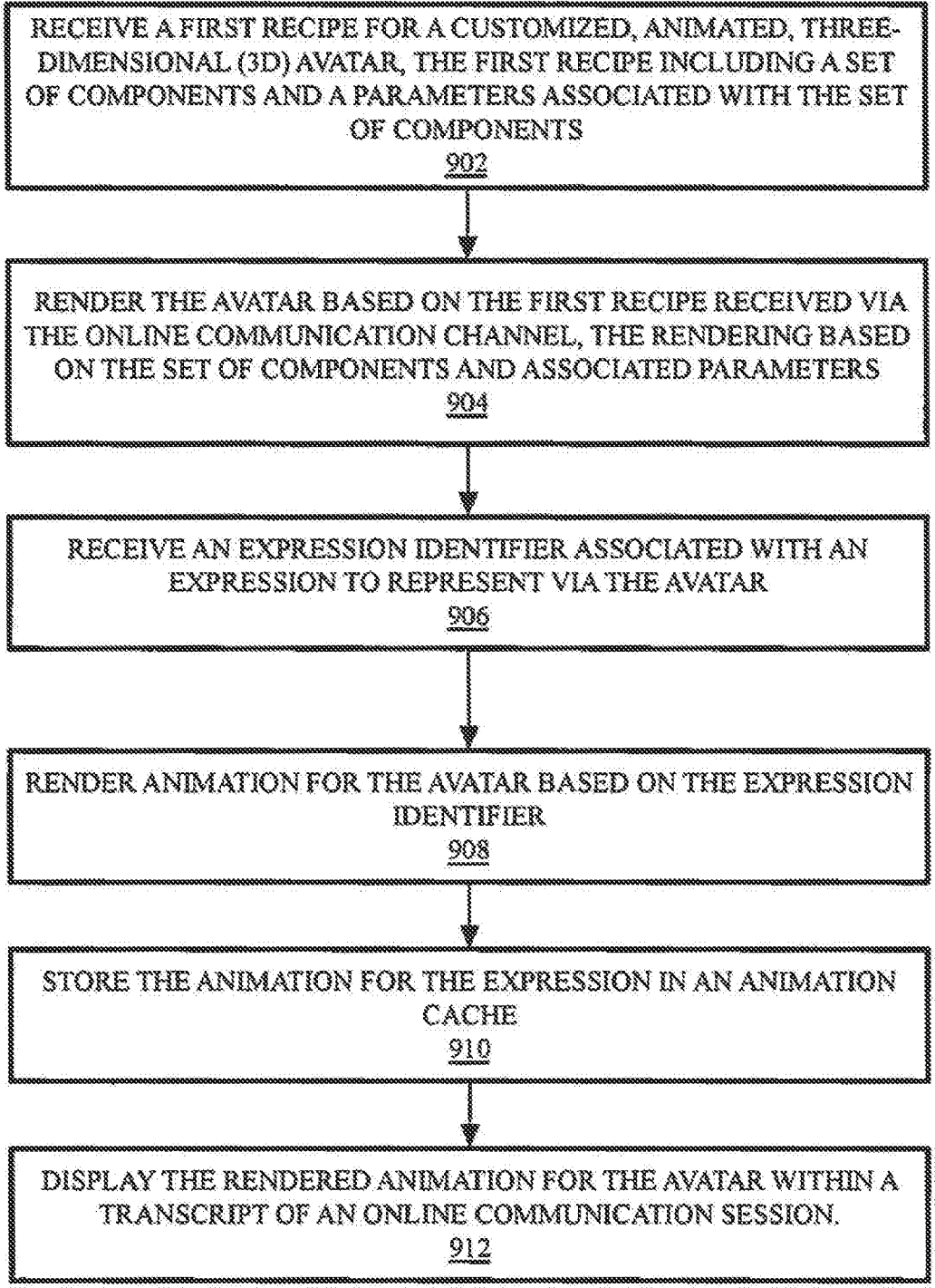
FIG. 9 is a flow diagram of avatar communication and display logic, according to an embodiment.

FIG. 9 is a flow diagram of avatar communication and display logic 900, according to an embodiment. In one embodiment the avatar communication and display logic can be performed by a messaging client and avatar display and rendering application, such as messaging client 414 and sticker app 412 as in FIG. 4 through FIG. 6.

In one embodiment the avatar communication and display logic 900 can receive a first recipe for a customized, animated, and three-dimensional (3D) avatar, as shown at 902. The first recipe can include a set of components and parameters associated with the set of components. In one embodiment the set of components can define the assets to use to render the avatar. The parameters can be used to further define or refine the component information.

The avatar communication and display logic 900, based on the first recipe received via the online communication channel, can render the avatar, as shown at 904. The avatar can be rendered based on the set of components and associated parameters of the first recipe.

The avatar communication and display logic 900 can also receive an expression identifier associated with an expression to represent via the avatar, as shown at 906. The expression identifier can be received separately from an avatar recipe or can be receive along with the recipe for an avatar. In response to a received expression identifier, the avatar communication and display logic 900 can render animation for the avatar based on the expression identifier, as shown at 908.

The avatar communication and display logic 900 can also store the animation for the expression in an animation cache, as shown at 910. In the event the avatar animation is to be re-played, the cached animation can be retrieved.

The avatar communication and display logic 900, as shown at 912, can then display the pre-rendered animation for the avatar within an online communication transcript. In the event an expression identifier is received along with a recipe, the animation associated with the expression identifier can be rendered after the avatar is rendered and the animations for other expressions can be rendered while the animation for the received expression identifier is displayed. In one embodiment an avatar framework provides an API to enable a user interface view object including an avatar or avatar animation to be provided to a messaging client, as illustrated in FIGS. 3A-B. In one embodiment the avatar and/or animation is provided as an image or an animated image.

Figure 10:
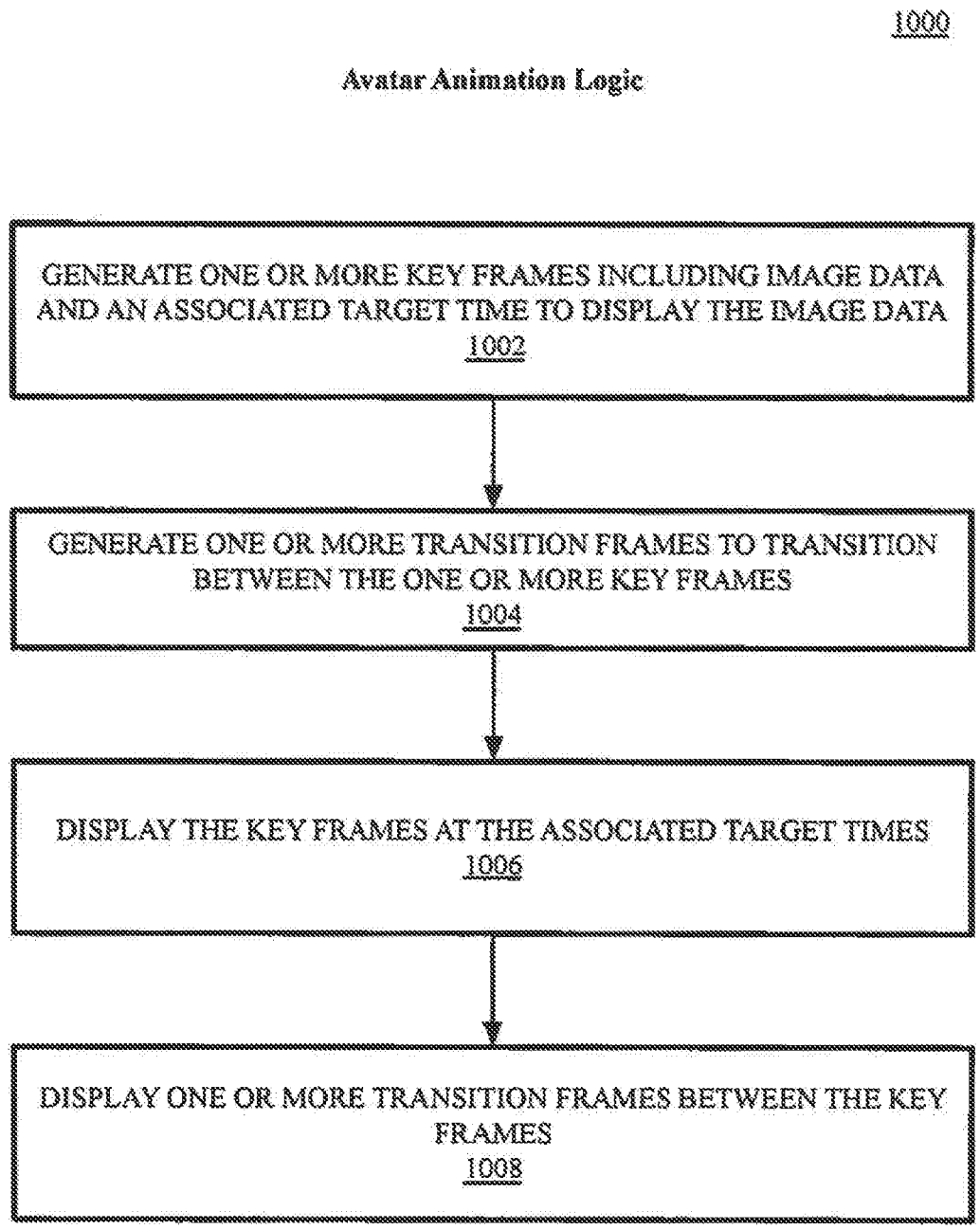
FIG. 10 is a flow diagram of avatar animation logic, according to an embodiment.

FIG. 10 is a flow diagram of avatar animation logic 1000, according to an embodiment. In one embodiment the avatar animation is key-frame based animation that is performed via a avatar application, such as the avatar sticker app 302 of FIGS. 3A-B. The avatar animation logic 1000 can generate one or more key frames including image data and an associated target time to display the image data, as shown at 1002. The avatar animation logic 1000 can then generate one or more transition frames to use to transition between the one or more key frames, as show at 1004. The avatar animation logic 1000 can then display the key frames at the associated target times, as shown at 1006. In between the target times in which the key frames are displayed, the avatar animation logic 1000 can display one or more transition frames to provide a smooth transition between the one or more key frames, as shown at 1008.

Figure 11:
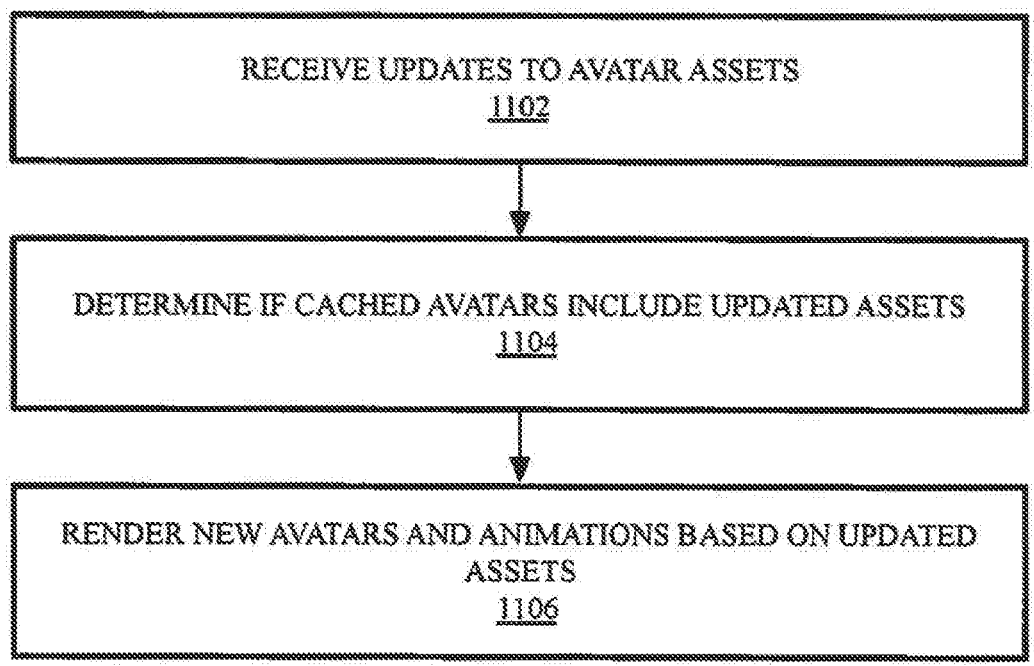
FIG. 11 is a flow diagram of avatar update logic, according to an embodiment.

FIG. 11 is a flow diagram of avatar update logic 1100, according to an embodiment. In one embodiment the avatar update logic 1100 can performed by a avatar application, such as the avatar sticker app 302 of FIGS. 3A-B. The avatar update logic 1100 can receive updates to avatar assets, as shown at 1102. For example, the avatar sticker app can be an application which is downloaded from an online application store. The avatar sticker app can be periodically updated to provide new assets or animations. Alternatively, at least some of the assets used for avatar generation may be provided by an operating system of the electronic device and may be updated when other operating system components are updated. In one embodiment at least some of the assets may be dynamically loaded. For example, a base level of assets may be pre-loaded with an operating system and other assets may be dynamically downloaded as they are needed. In one embodiment, assets may be downloaded upon receipt of an avatar or avatar sticker that makes use of the assets.

In one embodiment, after receiving an update to avatar assets, the avatar update logic 1100 can determine if any cached avatars include updated assets, as shown at 1104. The avatar update logic 1100 can then render new avatars and animations based on the updated assets, as shown at 1106. While the avatar update logic 1100 can render new avatars in response to an asset update, it may also be possible for a rendering techniques or a recipe associated with an avatar to be updated. In the event an updated recipe for an avatar is received, the avatar and associated animations can also be re-rendered. In the event an update to the avatar framework modifies rendering techniques associated with a recipe, the avatar associated with the recipe, and any affected animations, can also be re-rendered.

Figure 12:
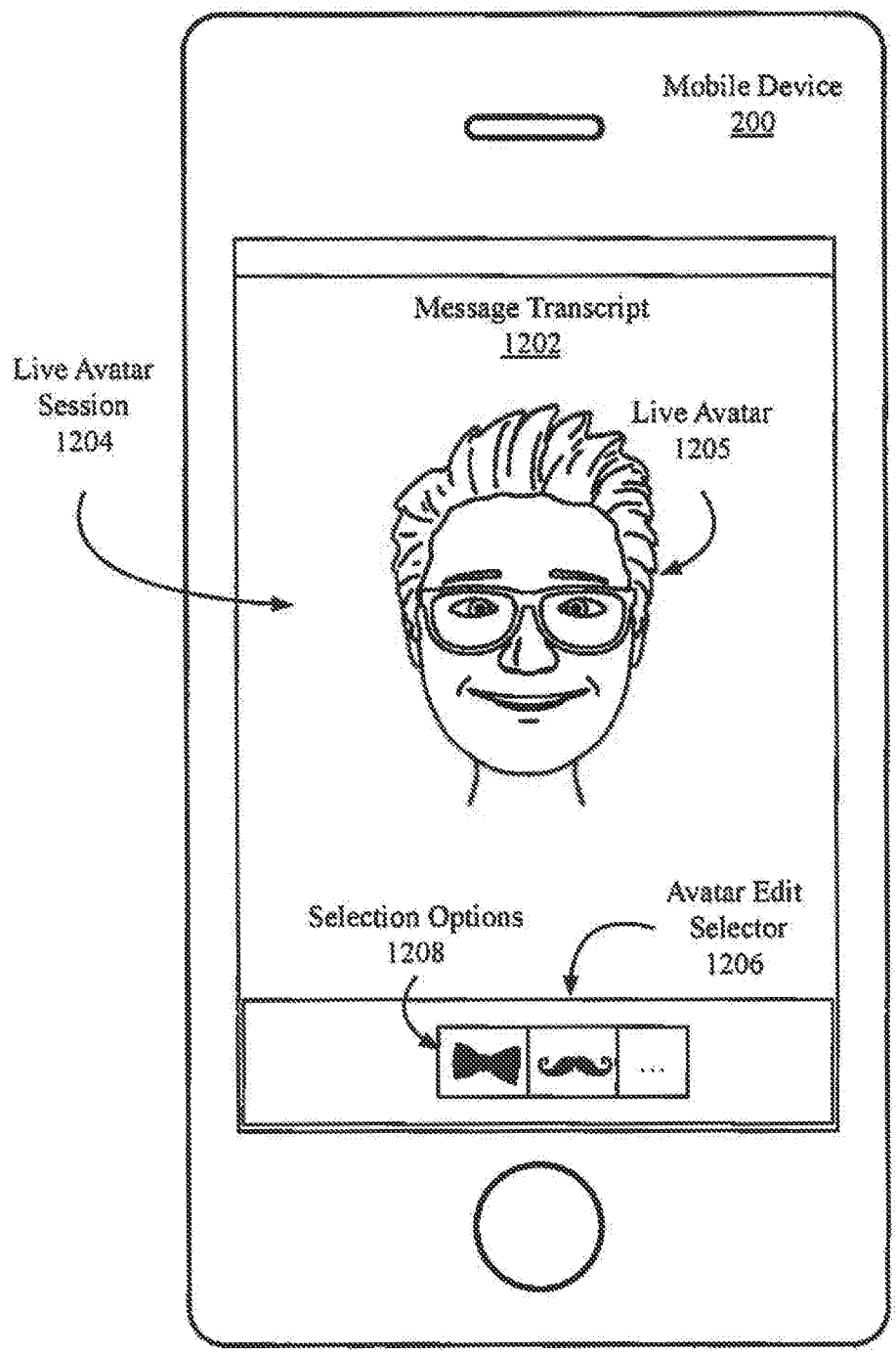
FIG. 12 is an illustration of a system for live avatar interaction, according to an embodiment.

FIG. 12 is an illustration of a system 1200 for live avatar interaction, according to an embodiment. One embodiment provides for a system 1200 including a mobile device 200 having a messaging app which displays a message transcript 1202, which may be similar to the message transcript 202 of FIG. 2. Within the message transcript 1202, a live avatar session 1204 can be performed in which a generated or received avatar can be interacted with and/or edited as a live avatar 1205.

In one embodiment the live avatar session 1204 enables interaction with the live avatar 1205, which is a continuously rendered and interactive representation of a received or generated avatar. In one embodiment, the live avatar 1205 can be configured to respond to inputs from an input device, such as a touch screen input device. Additionally, the live avatar 1205 can be configured to follow or track input received via an input device. For example, the touch screen input device may be used to poke or prod the live avatar 1205 and the avatar may respond to the input.

In one embodiment the live avatar 1205 can be edited while in the live avatar session 1204. For example, the live avatar 1205 can be re-positioned within the message transcript 1202. Metadata associated with the live avatar 1205 can be updated in response to the change in avatar position. In one embodiment an avatar edit selector 1206 can be displayed in association with the live avatar session 1204. The avatar edit selector 1206 can display selection options 1208 that may be selected and used to edit the live avatar 1205, for example, to apply stickers to the live avatar 1205 or edit characteristics or parameters of the avatar. In some instances, headgear or eyewear of the live avatar 1205 can be edited, added, or removed, or hair styles associated with the live avatar 1205 can be edited.

In one embodiment, the live avatar 1205 can be posed, such that one or more eyes of the live avatar 1205 can be opened or closed or the mouth of the live avatar 1205 can be opened or closed. In one embodiment a head position of a live avatar 1205 can be adjusted, such that the head of the live avatar 1205 may be tilted or rotated. In various embodiments, various other edits or manipulations of the live avatar 1205 may be performed. In one embodiment, the live avatar 1205 may be saved and sent to a user. The live avatar 1205 can be saved as a different instance of a previously received or created avatar, or can be saved as an edited instance of the previously received or created avatar. An image, animated image, or recipe for live avatar 1205 can then be sent to other devices.

In one embodiment, the live avatar session 1204 can be an interactive session across multiple client devices. For example, a live avatar session 1204 can be initiated in which a sending device can edit a live avatar 1205 and a receiving device can receive edits or manipulations of the live avatar 1205 in real time. In one embodiment the live avatar session 1204 can be configured such that both the sending device and the receiving device can interact with the live avatar 1205.

In one embodiment a user of an electronic device can create an avatar sticker using an avatar sticker app as described herein and affix the avatar sticker to a message transcript or message bubble within the message transcript, as described with respect to FIG. 2. In one embodiment, after placing the image onto the message transcript or message bubble (e.g., via a drag an drop operation) the user can also scale (e.g. enlarge or shrink) and/or rotate the sticker image within the message transcript or on a selected image bubble. In such embodiment, metadata can be associated with the avatar sticker to enable correct placement of the avatar sticker by a messaging client on a receiving electronic device. The avatar sticker and associated metadata, in one embodiment, can be sent directly to a receiving device in the event a P2P connection can be established between the sending device and the receiving device. In the event a P2P connection is not possible or not appropriate, a messaging platform, such as the messaging platform 410 of FIG. 4, FIG. 5, and FIGS. 6A-B can be used.

Figure 13:
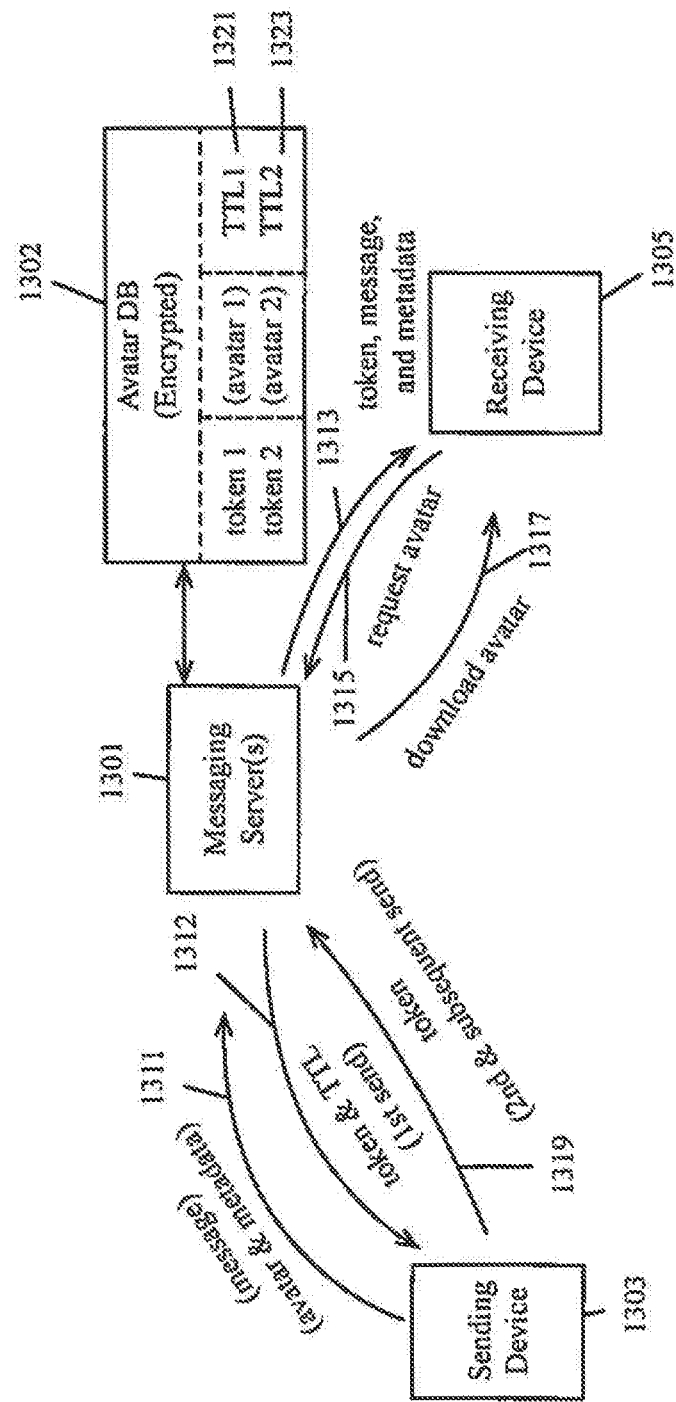
FIG. 13 is a block diagram of a message and sticker service system including one or more messaging server(s), according to embodiments.

FIG. 13 is a block diagram of a message and sticker service system 1300 including one or more messaging server(s) 1301, according to embodiments. In various embodiments, the one or more messaging server(s) 1301 can perform the functionality of the messaging platform 410 of FIG. 4. In one embodiment, a sending device 1303 sends a message and/or an avatar (1311) a messaging server of the one or more messaging server(s) 1301. The message and/or avatar (1311) can be encrypted during transmission to the messaging server. In one embodiment the message and/or avatar (1311) can be encrypted before transmission and stored on the messaging server in an encrypted format. Where the receiving device 1305 supports rendering of avatars from recipes, the sending device 1303 can send a message with an included recipe. Where the receiving device 1305 does not support the rendering of avatars from recipes, the sending device 1303 can send an image or an animated image or the avatar. For recipe based avatars and image based avatars, the sending device 1303 can also send any relevant metadata associated with the avatar.

In response to sending the message and/or avatar (1311) to the messaging server, one of the one or more messaging server(s) 1301 can send a download token and an associated time-to-live (TTL) value (1312), where the download token represents the optionally encrypted message and/or avatar (1311). The message and/or avatar, in one embodiment, is encrypted on a per receiver basis and the messaging servers can store multiple instances of the same avatar, each avatar encrypted with a different key of the corresponding receiving devices and each having a time-to-live value which can be refreshed by the sending device. On subsequent transmission of the same avatar to the same receiving device 1305, the sending device 1303 can re-send the download token (1319) that was previously obtained from the one or more messaging server(s) 1301.

In one embodiment the one or more messaging server(s) 1301 can maintain an avatar database 1302 which has, for each avatar, the corresponding token and a corresponding time-to-live value. The avatar database 1302 and/or each avatar can be stored in an encrypted format. For example, an encrypted avatar (avatar 1) can have a corresponding token value of token 1 and a corresponding time-to-live value of TTL1 shown in row 1321 of the avatar database 1302. Similarly, another avatar (avatar 2) can be associated with a row 1323 in the avatar database 802 and can have a corresponding token (token 2) and TTL value (TTL2). In one embodiment, avatar 1 and avatar 2 can be encrypted recipes or images for the same avatar image but for different receivers and are encrypted with different keys and thus are stored separately and in separate rows of the avatar database 1302.

In one embodiment the receiving device 1305 can receive (1313) an encrypted message, download token, and corresponding metadata for a message and/or avatar. The metadata in one embodiment can include a hash value created by a remote sticker extension app, such as the avatar sticker app 302 of FIG. 3, which can be used to create an avatar and/or avatar sticker. The metadata can also include a bubble identifier, if the avatar is affixed to a message bubble, as well as scaling and rotation metadata for use by a local sticker extension app to scale and rotate the avatar.

A messaging app at the receiving device 1305 can determine from the hash metadata whether a local copy of the avatar is available in an avatar cache. If no local copy exists then the receiving device 805 can send a request (1315) for the avatar using the download token and download (1317) the avatar.

It will be noted that where an avatar is described or illustrated as transmitted, the avatar can be transmitted as a recipe, as an image, or as an animated image, according to techniques described herein. Additionally, avatar metadata, such as the metadata used to specify position, orientation, rotation, scaling, etc., associated an avatar sticker can be transmitted from the sending device 1303 to the receiving device 1305 via the one or more messaging server(s) 1301 as in FIG. 13, or via a P2P connection as in FIG. 4, FIG. 5, and FIGS. 6A-B. Additionally, an avatar can be transmitted as a recipe, as an image, or as an animated image, either via the one or more messaging server(s) 1301 or via a P2P connection.

Furthermore, it is to be additionally noted that the avatar framework as descried herein can enable inter-process communication between a messaging client and avatar application, or the avatar framework and at least a portion of the avatar application can be libraries that are loaded into the process space of a messaging client. For example, the messaging client 304 and the avatar sticker application 302 of FIG. 3 can be separate processes that are communicatively coupled by the avatar framework 307, or the avatar framework 307 can enable the messaging client 304 and the avatar sticker application 302 to operate within the same process, or within the same process space.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Embodiments described herein include one or more application programming interfaces (APIs) in an environment in which calling program code interacts with other program code that is called through one or more programming interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embedment, call APIs from different providers such as a set of APIs from an OS provider and another set of APIs from a plug-in provider and another set of APIs from another provider (e.g. the provider of a software library) or creator of the another set of APIs.

Figure 14:
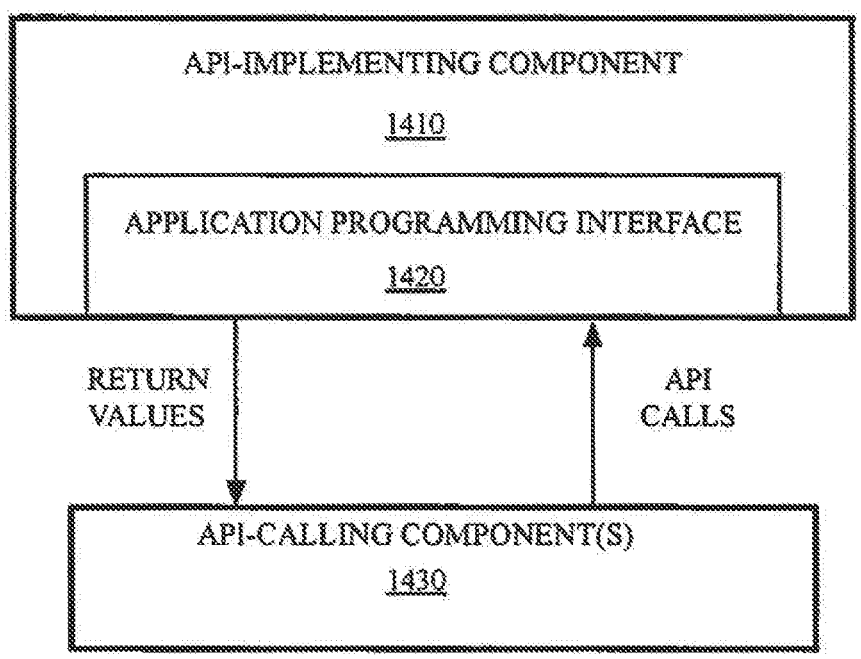
FIG. 14 is a block diagram illustrating an exemplary API architecture, which may be used in some embodiments of the invention.

FIG. 14 is a block diagram illustrating an exemplary API architecture, which may be used in some embodiments of the invention. As shown in FIG. 14, the API architecture 1400 includes the API-implementing component 1410 (e.g., an operating system, a library, a device driver, an API, an application program, software or other module) that implements the API 1420. The API 1420 specifies one or more functions, methods, classes, objects, protocols, data structures, formats and/or other features of the API-implementing component that may be used by the API-calling component 1430. The API 1420 can specify at least one calling convention that specifies how a function in the API-implementing component receives parameters from the API-calling component and how the function returns a result to the API-calling component. The API-calling component 1430 (e.g., an operating system, a library, a device driver, an API, an application program, software or other module), makes API calls through the API 1420 to access and use the features of the API-implementing component 1410 that are specified by the API 1420. The API-implementing component 1410 may return a value through the API 1420 to the API-calling component 1430 in response to an API call.

It will be appreciated that the API-implementing component 1410 may include additional functions, methods, classes, data structures, and/or other features that are not specified through the API 1420 and are not available to the API-calling component 1430. It should be understood that the API-calling component 1430 may be on the same system as the API-implementing component 1410 or may be located remotely and accesses the API-implementing component 1410 using the API 1420 over a network. While FIG. 14 illustrates a single API-calling component 1430 interacting with the API 1420, it should be understood that other API-calling components, which may be written in different languages (or the same language) than the API-calling component 1430, may use the API 1420.

The API-implementing component 1410, the API 1420, and the API-calling component 1430 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 15A:
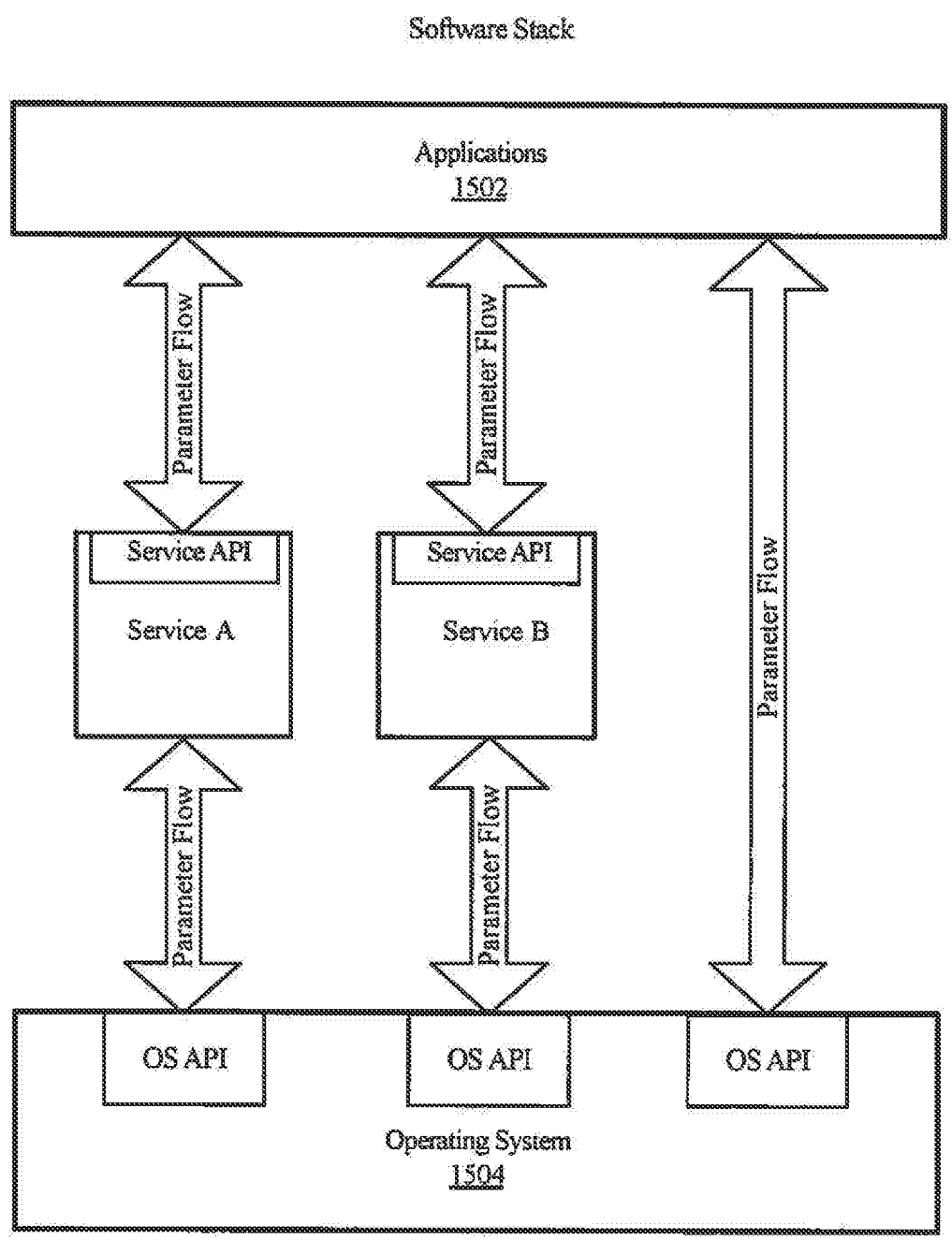
FIGS. 15A-B are block diagrams of exemplary API software stacks, according to embodiments.
Figure 15B:
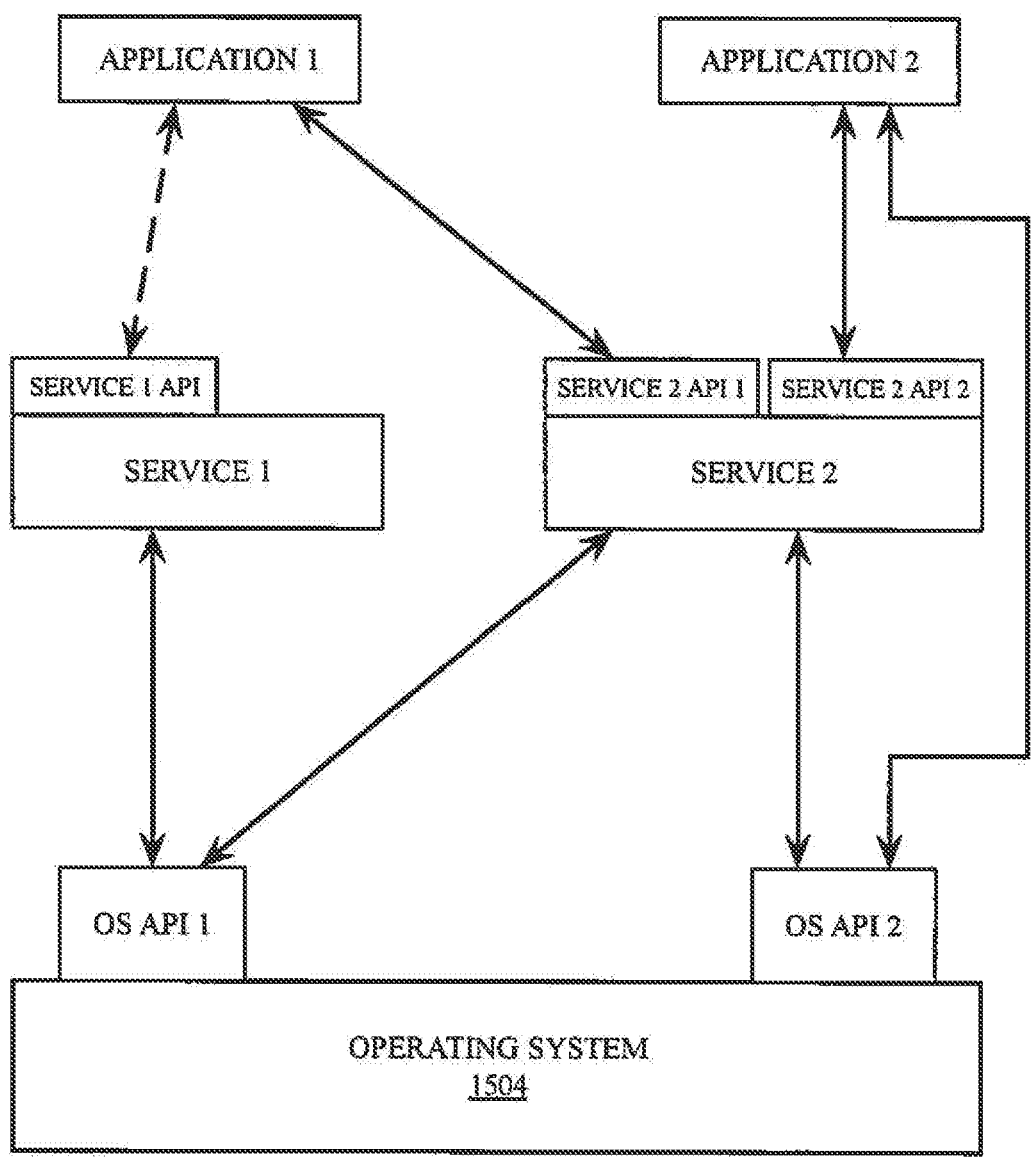

FIGS. 15A-B are block diagrams of exemplary API software stacks 1500, 1510, according to embodiments. FIG. 15A shows an exemplary software stack 1500 in which applications 1502 can make calls to Service A or Service B using Service API and to Operating System 1504 using an OS API. Additionally, Service A and Service B can make calls to Operating System 1504 using several OS APIs.

FIG. 15B shows an exemplary software stack 1510 including Application 1, Application 2, Service 1, Service 2, and Operating System 1504. As illustrated, Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library)

makes calls to and receives returned values from both OS API 1 and OS API 2. Application 2 makes calls to and receives returned values from OS API 2.

Figure 16:
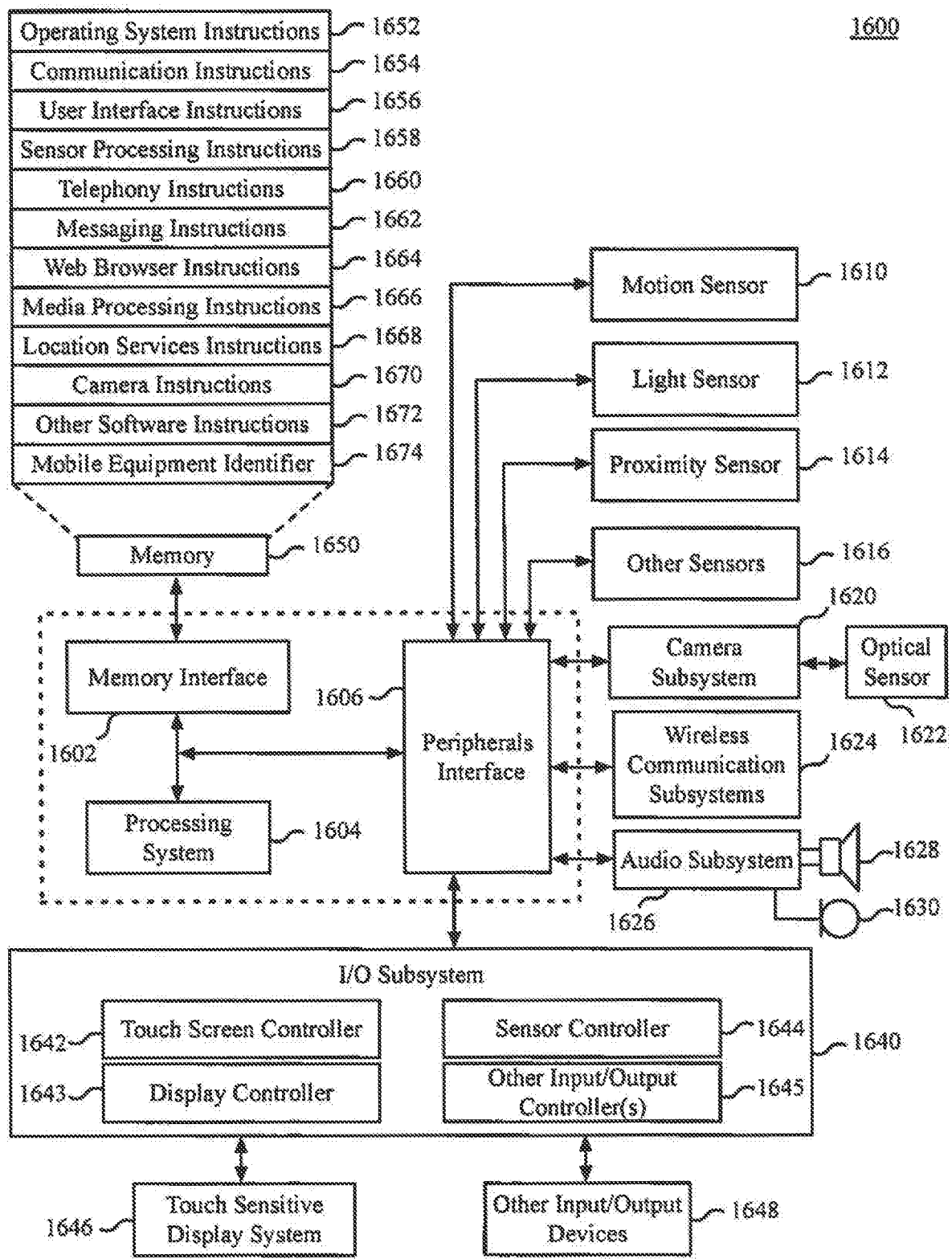
FIG. 16 is a block diagram of mobile device architecture, according to an embodiment.

FIG. 16 is a block diagram of mobile device architecture 1600, according to an embodiment. The mobile device architecture 1600 includes a include a memory interface 1602, a processing system 1604 including one or more data processors, image processors and/or graphics processing units, and a peripherals interface 1606. The various components can be coupled by one or more communication buses or signal lines. The various components can be separate logical components or devices or can be integrated in one or more integrated circuits, such as in a system on a chip integrated circuit.

The memory interface 1602 can be coupled to memory 1650, which can include high-speed random access memory such as static random access memory (SRAM) or dynamic random access memory (DRAM) and/or non-volatile memory, such as but not limited to flash memory (e.g., NAND flash, NOR flash, etc.).

Sensors, devices, and subsystems can be coupled to the peripherals interface 1606 to facilitate multiple functionalities. For example, a motion sensor 1610, a light sensor 1612, and a proximity sensor 1614 can be coupled to the peripherals interface 1606 to facilitate the mobile device functionality. Other sensors 1616 can also be connected to the peripherals interface 1606, such as a positioning system (e.g., GPS receiver), a temperature sensor, a biometric sensor, or other sensing device, to facilitate related functionalities. A camera subsystem 1620 and an optical sensor 1622, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1624, which can include radio frequency receivers and transmitters and/or optical (e.g., infrared) receivers and transmitters. The specific design and implementation of the wireless communication subsystems 1624 can depend on the communication network(s) over which a mobile device is intended to operate. For example, a mobile device including the illustrated mobile device architecture 1600 can include wireless communication subsystems 1624 designed to operate over a GSM network, a CDMA network, an LTE network, a Wi-Fi network, a Bluetooth network, or any other wireless network. In particular, the wireless communication subsystems 1624 can provide a communications mechanism over which a client browser application can retrieve resources from a remote web server.

An audio subsystem 1626 can be coupled to a speaker 1628 and a microphone 1630 to facilitate voice-enabled functions, such as voice recognition, voice replication, digital recording, and telephony functions.

The I/O subsystem 1640 can include a touch screen controller 1642 and/or other input controller(s) 1645. The touch-screen controller 1642 can be coupled to a touch screen (e.g., touch sensitive display system 1646). The touch screen and touch screen controller 1642 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1646. Display output for the touch sensitive display system 1646 can be generated by a display controller 1643. In one embodiment the display controller 1643 can provide frame data to the touch sensitive display system 1646 at a variable frame rate.

In one embodiment a sensor controller 1644 is included to monitor, control, and/or processes data received from one or more of the motion sensor 1610, light sensor 1612, proximity sensor 1614, or other sensors 1616. The sensor controller 1644 can include logic to interpret sensor data to determine the occurrence of one of more motion events or activities by analysis of the sensor data from the sensors.

In one embodiment the I/O subsystem 1640 includes other input controller(s) 1645 that can be coupled to other input/control devices 1648, such as one or more buttons, rocker switches, thumb-wheel, infrared port, USB port, and/or a pointer device such as a stylus, or control devices such as an up/down button for volume control of the speaker 1628 and/or the microphone 1630.

In one embodiment, the memory 1650 coupled to the memory interface 1602 can store instructions for an operating system 1652, including portable operating system interface (POSIX) compliant and non-compliant operating system or an embedded operating system. The operating system 1652 may include instructions for handling basic system services and for performing hardware dependent tasks. In some implementations, the operating system 1652 can be a kernel.

The memory 1650 can also store communication instructions 1654 to facilitate communicating with one or more additional devices, one or more computers and/or one or more servers, for example, to retrieve web resources from remote web servers. The memory 1650 can also include user interface instructions 1656, including graphical user interface instructions to facilitate graphic user interface processing.

Additionally, the memory 1650 can store sensor processing instructions 1658 to facilitate sensor-related processing and functions; telephony instructions 1660 to facilitate telephone-related processes and functions; messaging instructions 1662 to facilitate electronic-messaging related processes and functions; web browser instructions 1664 to facilitate web browsing-related processes and functions; media processing instructions 1666 to facilitate media processing-related processes and functions; location services instructions including GPS and/or navigation instructions 1668 and Wi-Fi based location instructions to facilitate location based functionality; camera instructions 1670 to facilitate camera-related processes and functions; and/or other software instructions 1672 to facilitate other processes and functions, e.g., security processes and functions, and processes and functions related to the systems. The memory 1650 may also store other software instructions such as web video instructions to facilitate web video-related processes and functions; and/or web shopping instructions to facilitate web shopping-related processes and functions. In some implementations, the media processing instructions 1666 are divided into audio processing instructions and video processing instructions to facilitate audio processing-related processes and functions and video processing-related processes and functions, respectively. A mobile equipment identifier, such as an International Mobile Equipment Identity (IMEI) 1674 or a similar hardware identifier can also be stored in memory 1650.

Each of the above identified instructions and applications can correspond to a set of instructions for performing one or more functions described above. These instructions need not be implemented as separate software programs, procedures, or modules. The memory 1650 can include additional instructions or fewer instructions. Furthermore, various functions may be implemented in hardware and/or in software, including in one or more signal processing and/or application specific integrated circuits.

Figure 17:
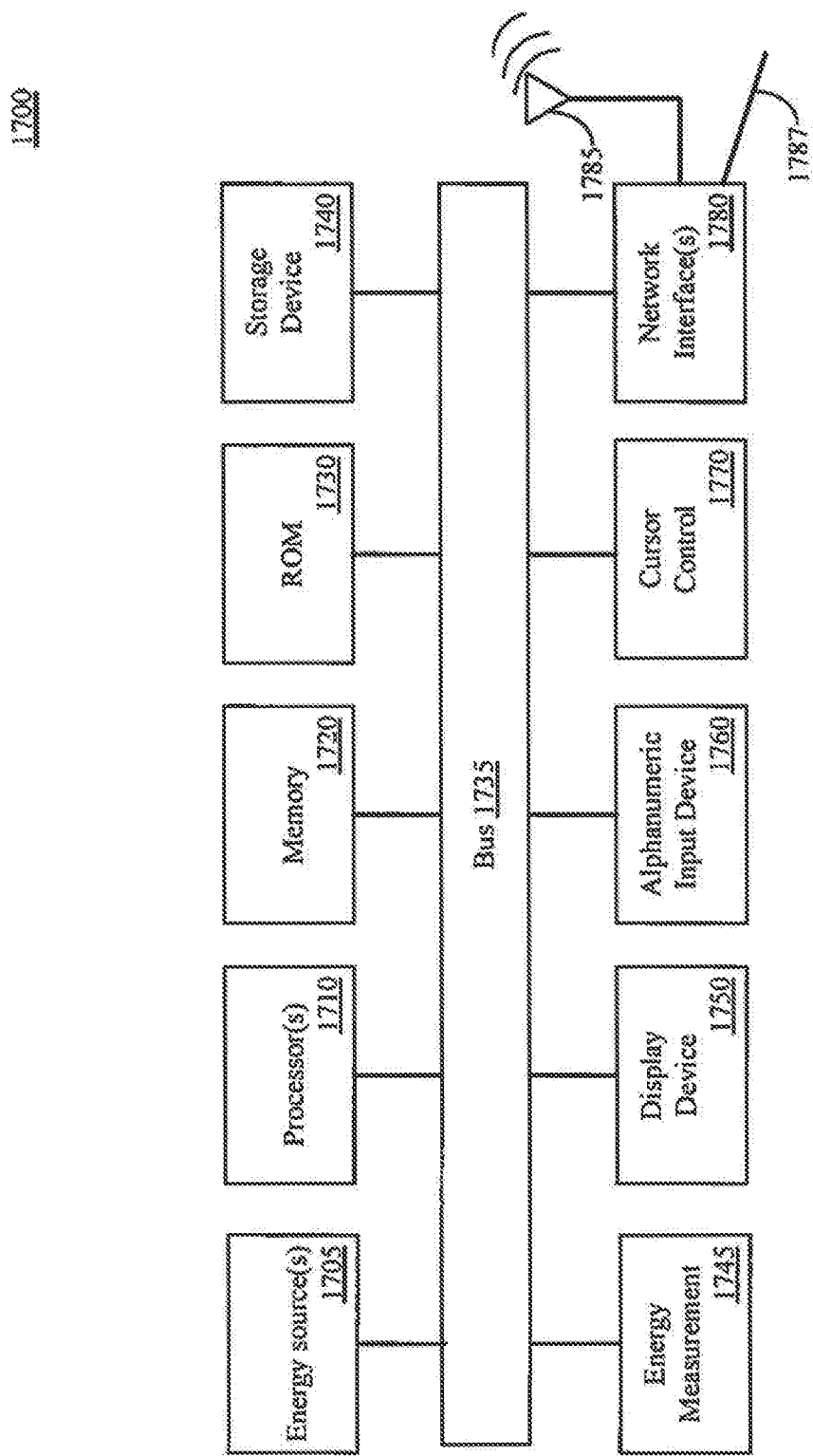
FIG. 17 is a block diagram of one embodiment of a computing system.

FIG. 17 is a block diagram of one embodiment of a computing system 1700. The computing system illustrated in FIG. 17 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 17 may be used to provide the computing device and/or the server device.

Computing system 1700 includes bus 1735 or other communication device to communicate information, and processor 1710 coupled to bus 1735 that may process information.

While computing system 1700 is illustrated with a single processor, computing system 1700 may include multiple processors and/or co-processors 1710. Computing system 1700 further may include system main memory 1720 in the form of random access memory (RAM) or other dynamic storage device coupled to bus 1735 and may store information and instructions that may be executed by processor(s) 1710. Main memory 1720 may also be used to store temporary variables or other intermediate information during execution of instructions by processor 1710.

Computing system 1700 may also include read only memory (ROM) 1730 and/or another data storage device 1740 coupled to bus 1735 that may store information and instructions for processor(s) 1710. Data storage device 1740 may be coupled to bus 1735 to store information and instructions. Data storage device 1740 such as flash memory or a magnetic disk or optical disc and corresponding drive may be coupled to computing system 1700.

Computing system 1700 may also be coupled via bus 1735 to display device 1750, such as a cathode ray tube (CRT), a liquid crystal display (LCD), or a light emitting diode (LED) display, to display information to a user. Computing system 1700 can also include an alphanumeric input device 1760, including alphanumeric and other keys, which may be coupled to bus 1735 to communicate information and command selections to processor(s) 1710. Another type of user input device is cursor control 1770, such as a touchpad, a mouse, a trackball, or cursor direction keys to communicate direction information and command selections to processor(s) 1710 and to control cursor movement on display device 1750. Computing system 1700 may also receive user input from a remote device that is communicatively coupled to computing system 1700 via one or more network interface(s) 1780.

Computing system 1700 further may include one or more network interface(s) 1780 to provide access to a network, such as a local area network. Network interface(s) 1780 may include, for example, a wireless network interface having antenna 1785, which may represent one or more antenna(e). Computing system 1700 can include multiple wireless network interfaces such as a combination of WiFi, Bluetooth®, near field communication (NFC), and/or cellular telephony interfaces. Network interface(s) 1780 may also include, for example, a wired network interface to communicate with remote devices via network cable 1787, which may be, for example, an Ethernet cable, a coaxial cable, a fiber optic cable, a serial cable, or a parallel cable.

In one embodiment, network interface(s) 1780 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1780 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

Computing system 1700 can further include one or more energy sources 1705 and an one or more energy measurement systems 1745. Energy sources 1705 can include an AC/DC adapter coupled to an external power source, one or more batteries, one or more charge storage devices, a USB charger, or other energy source. Energy measurement systems include at least one voltage or amperage measuring device that can measure energy consumed by the computing system 1700 during a predetermined period of time. Additionally, one or more energy measurement systems can be included that measure, e.g., energy consumed by a display device, cooling subsystem, WiFi subsystem, or other frequently-used or high energy consumption subsystem.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Additionally various components described herein can be a means for performing the operations or functions described in accordance with an embodiment.

Various embodiments provide for techniques to facilitate online communication. In one embodiment, the communication is facilitated by providing a framework to enable the transmission of three dimensional avatars across the messaging platform. The avatars may be recipe based, such that a receiving client device can receive the avatar recipe and render an avatar based on the recipe. In one embodiment the recipe includes set of components and a parameters associated with the set of components. An expression identifier associated with an expression to represent via the avatar can be received via the messaging platform and an animation of the avatar can be displayed to convey the intended expression.

One embodiment provides for a non-transitory machine readable medium storing instructions which, when executed by one or more processors, cause the one or more processors to perform operations facilitating online communication, the operations comprising receiving, via a online communication channel, a first recipe for a customized avatar, the first recipe including a set of components and a parameters associated with the set of components; rendering the customized avatar based on the first recipe received via the online communication channel, the rendering based on the set of components and associated parameters; receiving, via the online communication channel, an expression identifier associated with an expression to represent via the customized avatar; rendering an animation for the customized avatar based on the expression identifier; and displaying the rendered animation for the avatar within an online communication transcript. The expression identifier can be received with the first recipe.

In a further embodiment, the operations additionally comprise associating a first application for establishing the online communication with avatar logic configured to generate a second recipe. The avatar logic can be a library loaded by the first application, or can be in part a framework to enable receipt of avatar data via an inter-process communication message.

In one embodiment, the operations additionally comprise pre-rendering a set of animations based on the second recipe, where the set of animations include animations associated with multiple expression identifiers. The second recipe can be transmitted to a message client on a receiving device via an online communication channel.

In one embodiment, the operations additionally include providing a browser enabling selection of an expression to convey via an avatar animation. The expression can be communicated by transmitting an identifier of a selected expression via the online communication channel. Additionally, a contact list entry can be associated with a recipe for an avatar and the avatar can be displayed in association with the contact list entry. In one embodiment, updates to a received recipe can be received and new animations can be rendered based on the update.

In one embodiment, rendering animations for a customized avatar includes generating one or more key frames for the animation, where each key frame includes image data and each key frame is associated with a target time to display the image data. Rendering the animation can additionally include generating one or more transition frames to transition between the one or more key frames. The animation can be rendered based on a set of pre-loaded image assets, each image asset associated with an element of a recipe.

One embodiment provides for a system comprising a non-transitory machine readable storage device to store instructions and one or more processors to execute the instructions. The instructions, when executed, cause the one or more processors to provide a framework to enable definition of a recipe for a customized avatar, the recipe to identify an asset in a set of pre-defined assets for use in to render elements of the avatar; determine if a receiving client connected via a online communication channel established for online messaging supports a rendering an avatar based on the recipe; and transmit the recipe via the online communication channel to the receiving client in response to a determination that the receiving client supports the recipe, the receiving client to render the avatar based on the recipe and display the avatar in an online communication transcript.

It is contemplated that the invention includes all systems and methods that can be practiced from all suitable combinations of the various embodiments described herein. Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and claims.

What is claimed is:

1. A method, comprising:
   receiving, at a first device from a second device, a recipe and a first expression identifier of a plurality of expression identifiers for a customized avatar;
   displaying, by the first device, the customized avatar, based on the recipe, with a first animation corresponding to the first expression identifier,
   wherein the customized avatar has not been previously displayed by the first device without the first animation corresponding to the first expression identifier, and wherein receiving the recipe and the first expression identifier at the first device from the second device comprises receiving the recipe along with the first expression identifier in a single message from the first device;
   receiving at least second and third expression identifiers of the plurality of expression identifiers for the customized avatar at the first device from the second device; and
   while displaying the customized avatar with the first animation corresponding to the first expression identifier, pre-rendering the customized avatar with at least second and third animations corresponding to at least the second and third expression identifiers.

2. The method of claim 1, wherein the recipe, the first expression identifier, and the second and third expression identifiers are received at the first device from the second device during a handshake operation between the first device and the second device.

3. The method of claim 2, further comprising, prior to displaying the customized avatar with the first animation corresponding to the first expression identifier:
   pre-rendering the customized avatar with the first animation corresponding to the first expression identifier.

4. The method of claim 1, wherein displaying the customized avatar with first the animation corresponding to the first expression identifier comprises displaying the customized avatar with the first animation corresponding to the first expression identifier in a message transcript of a messaging application, and wherein the method further comprises rendering the customized avatar with the first animation corresponding to the first expression identifier with an application other than the messaging application.

5. A device comprising:
   a non-transitory machine readable storage device to store instructions; and
   one or more processors to execute the instructions, wherein the instructions, when executed, cause the one or more processors to:
      receive, at a first device from a second device, a recipe and a first expression identifier of a plurality of expression identifiers for a customized avatar, by receiving the recipe along with the first expression identifier in a single message from the first device;
      display, by the first device, the customized avatar, based on the recipe, with a first animation corresponding to the first expression identifier,
      wherein the customized avatar has not been previously displayed by the first device without the first animation corresponding to the first expression identifier;

receive at least second and third expression identifiers of the plurality of expression identifiers for the customized avatar at the first device from the second device; and while displaying the customized avatar with the first animation corresponding to the first expression identifier, pre-render the customized avatar with at least second and third animations corresponding to at least the second and third expression identifiers.

6. The device of claim 5, wherein the recipe, the first expression identifier, and the second and third expression identifiers are received at the first device from the second device during a handshake operation between the first device and the second device.

7. The device of claim 6, wherein, when executed, the instructions further cause the one or more processors to, prior to displaying the customized avatar with the first animation corresponding to the first expression identifier:

pre-render, by the first device, the customized avatar with the first animation corresponding to the first expression identifier.

8. The device of claim 5, wherein the one or more processors display the customized avatar with the first animation corresponding to the first expression identifier in a message transcript of a messaging application, and wherein, when executed, the instructions further cause the one or more processors to render the customized avatar with the first animation corresponding to the first expression identifier with an application other than the messaging application.

9. A non-transitory machine readable medium storing instructions which, when executed by one or more processors, cause the one or more processors to perform operations comprising:

receiving, at a first device from a second device, a recipe and a first expression identifier of a plurality of expression identifiers for a customized avatar, by receiving the recipe along with the first expression identifier in a single message from the first device;

displaying, by the first device, the customized avatar, based on the recipe, with a first animation corresponding to the first expression identifier, wherein the customized avatar has not been previously displayed by the first device without the first animation corresponding to the first expression identifier;

receiving at least second and third expression identifiers of the plurality of expression identifiers for the customized avatar at the first device from the second device; and while displaying the customized avatar with the first animation corresponding to the first expression identifier, pre-rendering, by the first device, the customized avatar with at least second and third animations corresponding to at least the second and third expression identifiers.

10. The non-transitory machine readable medium of claim 9, wherein the recipe, the first expression identifier, and the second and third expression identifiers are received at the first device from the second device during a handshake operation between the first device and the second device.

11. The non-transitory machine readable medium of claim 10, the operations further comprising, prior to displaying the customized avatar with the first animation corresponding to the first expression identifier:

pre-rendering the customized avatar with the first animation corresponding to the first expression identifier.

* * * * *